United States Patent [19]

Davis et al.

[11] Patent Number: 5,559,548
[45] Date of Patent: Sep. 24, 1996

[54] SYSTEM AND METHOD FOR GENERATING AN INFORMATION DISPLAY SCHEDULE FOR AN ELECTRONIC PROGRAM GUIDE

[76] Inventors: Bruce Davis, 5505 Preserve Pkwy. South, Greenwood Village, Colo. 80121; James Gutman, 6745 S. Detroit Ct., Littleton, Colo. 80122; Michael Heydt, 1509 Reed St., Coatesville, Pa. 19320; Larry Miller, 35 Glenmoore Dr., Greenwood Village, Colo. 80111

[21] Appl. No.: 311,475

[22] Filed: Sep. 23, 1994

Related U.S. Application Data

[63] Continuation-in-part of Ser. No. 247,059, May 20, 1994.

[51] Int. Cl.$^6$ .................................................. H04N 7/10
[52] U.S. Cl. ................................................ 348/6; 348/906
[58] Field of Search ............................... 348/3, 7, 906, 348/10, 563, 460; H04N 7/10

[56] References Cited

U.S. PATENT DOCUMENTS

| | | | |
|---|---|---|---|
| 5,027,400 | 6/1991 | Baji et al. | 348/10 X |
| 5,038,211 | 8/1991 | Hallenbeck | 348/906 X |
| 5,133,081 | 7/1992 | Mayo | 455/18 |
| 5,223,924 | 6/1993 | Strubbe . | |
| 5,231,493 | 7/1993 | Apitz . | |
| 5,283,639 | 2/1994 | Esch et al. | 348/906 X |
| 5,311,423 | 5/1994 | Clark . | |
| 5,353,121 | 10/1994 | Young et al. | 348/563 |
| 5,357,276 | 10/1994 | Banker et al. | 348/7 |
| 5,404,505 | 4/1995 | Levinson | 348/3 X |
| 5,412,720 | 5/1995 | Hoarty | 348/12 X |
| 5,428,789 | 6/1995 | Waldron, III | 395/700 |

FOREIGN PATENT DOCUMENTS

| | | |
|---|---|---|
| 2662895 | 12/1991 | France . |
| 3246225 | 6/1989 | Germany . |
| 6217271 | 8/1994 | Japan . |
| 2129649 | 5/1984 | United Kingdom . |
| 9100670 | 1/1991 | WIPO . |
| 9119391 | 12/1991 | WIPO . |
| 9204801 | 3/1992 | WIPO . |

OTHER PUBLICATIONS

Brugliera, Vito, "Digital On–Screen Display—A New Technology for the Consumer Interface", *Symposium Record Cable Sessions*. Jun. 11, 1993, pp. 571–586.
TV Communications Advertisement for MSI Datacasting Systems, Jan. 1973.

(List continued on next page.)

*Primary Examiner*—Victor R. Kostak
*Assistant Examiner*—Martha J. Hopkins
*Attorney, Agent, or Firm*—Weil, Gotshal & Manges

[57] ABSTRACT

An electronic program schedule system which includes a receiver for receiving television program schedule information and promotional information transmitted via satellite, a digital playback system for storing the schedule and promotional information and formatting pages of said information, and a cable television channel modulator for modulating the pages of information onto a cable television system. A data processor in the playback system receives and stores in a memory television program schedule information for a plurality of television programs to appear on the plurality of television channels. A television receiver is used to display the television program schedule and promotional information by tuning the receiver or cable converter box to the designated channel upon which the signals are modulated. A multimedia generator receives control commands from the data processor and program schedule information from the memory and displays a portion of the program schedule information in either full screen grid format or partial screen grid format together with promotional information, as controlled by a schedule for display of the promotional information resident in the data processor. The data processor controls the multimedia generator with control commands, issued in response to a computer program resident on the data processor, to display program schedule information and promotional information.

50 Claims, 19 Drawing Sheets

OTHER PUBLICATIONS

Robinson, G., and Loveless, W., "Touch-Tone' Teletext—A Combined Teletext–Viewdata System," IEEE Transactions on Consumer Electronics, vol. CE–25, No. 3, Jul. 1979, pp. 298–303.

Tanton, N. E., "UK Teletext—Evolution and Potential," IEEE Transactions on Consumer Electronics, vol. CE–25, No. 3, Jul. 1979, pp. 246–250.

Compuvid Sales Manual (date unknown).

Roizen, Joseph, "Teletext in the USA," SMPTE Journal, Jul. 1981, pp. 602–610.

Advertisement for "TV Decision," CableVision, Aug. 4, 1986.

Fassihi, Theresa & Bishop, Nancy, "Cable Guide Courting National Advertisers," Adweek, Aug. 8, 1988.

Antonofs, M., "Stay Tuned for Smart TV," Popular Science, Nov. 1990, pp. 62–65.

Manners, George, "Smart Screens; Development of Personal Navigation Systems for TV Viewers," Video Magazine, Dec. 1993.

Preview Guide Brochure, Spring, 1994.

| | 8:30 | 9PM | 9:30 | 10PM |
|---|---|---|---|---|
| 23 WGBS | Movie: To be Announced | | | St. Elsewhere |
| 24 LIF | Out of the Shadows (NR) 1988 Alexandra Paul, Charles Dance | | | Girls' Night Out |
| 25 CNN | News | TBA | | News |
| 27 SHO | Mr. Destiny (PG-13) 1990 James Belushi, Linda Hamilton | | | Royce |
| 30 ESPN | Stanley Cup Playoff | | | |
| 31 FAM | Arrowhead (NR) 1953 Charlton Heston, Jack Palance | | | Snowy River |

TV GUIDE 8:35

FIG. 5b

TV GUIDE
9:04

| | 9PM | 9:30 | 10PM | 10:30 |
|---|---|---|---|---|
| 33 MAX | The last of the Mohicans (R)1992 Daniel Day-Lewis | | Bounty Trucker (R)1993 Lorenzo Lamas | |
| 34 DSC | Secrets of the Deep | | Justice Files | |
| 35 TNT | NBA PLAYOFF | NBA PLAYOFF | | |
| 36 A&E | The Lives of a Bengal Lancer (NR) 1935 | | Best of Comic Relief | |
| 37 USA | The Return of the Living Dead (R) 1985 Clu Gulager | | Weird Science | Duckman |
| 38 NIK | Ren & Stimpy | Are You Afraid? | To be Announced | |

FIG. 5c

TV GUIDE
8:51

The Firm
A lawyer (Tom Cruise) finds that his bosses are mob cotrolled
To order call 1-800-555-1212

|  | 8:30 | 9PM | 9:30 | 10PM |
|---|---|---|---|---|
| 30 ESPN | Stanley Cup Playoff | | | |
| 31 FAM | Arrowhead (NR)1953 Charlton Heston, Jack Palance | | | Snowy River |
| 33 MAX | The last of the Mohicans (R)1992 Daniel Day-Lewis Madeleine Stowe | | | Bounty Trucker(R) |
| 34 DSC | Safari | Secrets of the Deep | | Justice Files |

FIG. 7b

TV
GUIDE
9:02

The Firm

A lawyer (Tom Cruise) finds that his bosses are mob cotrolled

To order call 1-800-555-1212

|  | 9PM | 9:30 | 10PM | 10:30 |
|---|---|---|---|---|
| 35 TNT | NBA PLAYOFF | NBA PLAYOFF | | |
| 36 A&E | The Lives of a Bengal Lancer (NR) 1935 | | Best of Comic Relief | |
| 37 USA | The Return of the Living Dead (R) 1985 Clu Gulager | | Weird Science | Duckman |
| 38 NIK | Ren & Stimpy | Are You Afraid? | To be Announced | |

FIG. 7c

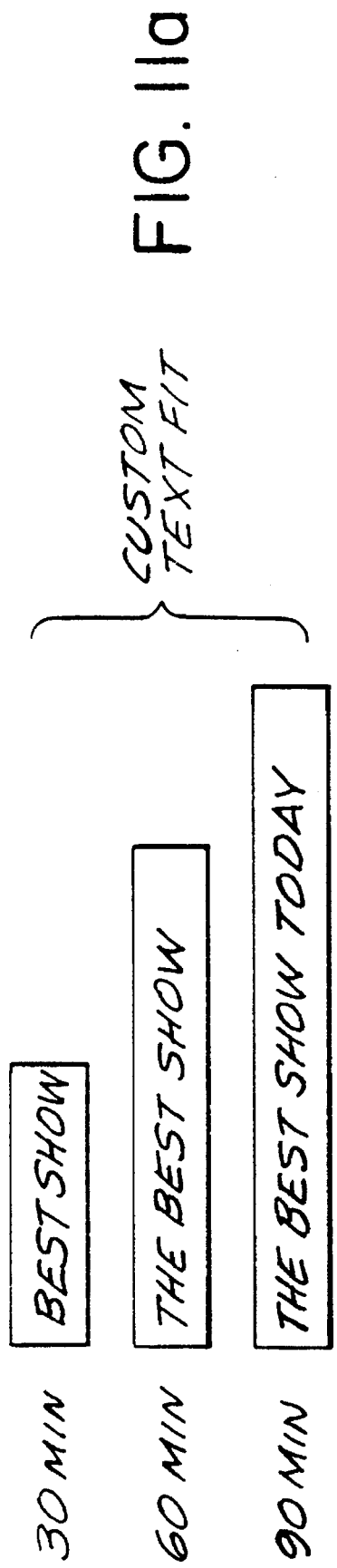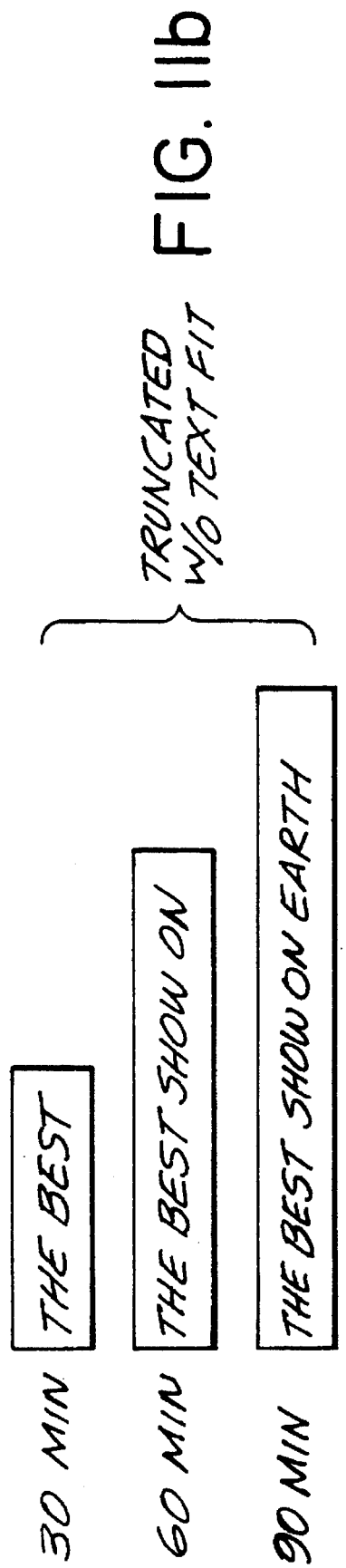

SYSTEM AND METHOD FOR GENERATING AN INFORMATION DISPLAY SCHEDULE FOR AN ELECTRONIC PROGRAM GUIDE

This application is a continuation-in-part of co-pending application Ser. No. 08/247,059, filed May 20, 1994.

BACKGROUND OF THE INVENTION

This invention relates to an electronic program guide system which provides a user with schedule information for broadcast or cablecast programs available for viewing on a television receiver. More particularly, it relates to an improved electronic program guide channel that provides the viewer with a more versatile, readable, and aesthetically pleasing display of program listings as well as promotional information.

Electronic program guides for television systems are known in the art, particularly with regard to cable television systems. For example, one common implementation of a electronic program guide channel utilizes a dedicated cable television channel for continuously broadcasting program schedule information. The advantage of such a system is that it is relatively easy to deploy because it is centrally implemented at the cable head-end. No additional electronics or software are required at the viewer location because full control of the display is maintained at the cable headend. The display information is then broadcast continuously on a dedicated cable channel. The television viewer simply tunes the cable converter box or television tuner to the channel on which the schedule information is modulated and views the program listings. Typically, these program guides utilize a scrolling display of television listings. Some systems employ a partial screen of listings with additional information in the remainder of the screen such as advertisements for movies on pay channels, pay-per-view (PPV) event schedules, time and weather information, and other commercial information. These systems generally incorporate a grid or matrix to display the program schedule information, with a different row for each channel and columns representing different time slots.

Collectively, the prior electronic program guide systems are frustrating for the viewer and do not incorporate features that render them especially useful. They also lack features that would make them aesthetically pleasing to watch. These deficiencies contribute to their limited use by viewers and general preference for printed television schedules. For example, only a few rows (channels) are typically displayed at one time and scrolled either continuously or periodically, so that, in a cable system with a large number of channels, the time for completing one cycle through the listings for all the channels may be several minutes, and the viewer may be required to wait some time to view the schedule for a desired channel. In addition, many viewers may find a continuously scrolling program guide difficult to read because their eyes must follow the listings as they move up the screen. Scrolling listings are also used in guides that display program listings in a split screen format together with promotional and other information. The split screen format is necessitated because of the need to include commercial advertising in the screen as well as the schedule information. However, it may be frustrating for viewers to be forced to continuously view this information while they are waiting for the schedule information for a desired channel to appear on the display.

Another possible reason why electronic program guides are under-utilized is they simply are boring to watch. While a full screen of listings allows for the display of more schedule information at one time and thus a shorter cycle time through the entire program schedule, viewers could be bored by the monotony of continuously viewing a full screen of listings. As indicated above, however, split screen program guides that simultaneously display additional information of possible interest to the viewer have the disadvantage of much longer cycle times.

An additional problem with prior program guides is that program titles must be truncated to fit into the cells of the grid. The width of the grid cells vary with the duration of the program. Thus, a 30 minute program is allotted only a small amount of space for the program title and description. Therefore, titles and/or descriptions for half and even full hour programs must often be truncated in order to fit into the allotted space. Some systems simply cut off the description of a program without abbreviating it in any way so the user is unable to determine the subject matter of the program. For example, a recent television program display included the following text in a grid cell: "Baseball: Yankees v." Truncation of program listings in this manner greatly reduces the utility of the program guide and is frustrating for viewers. Although some systems partially alleviate this problem by providing two lines of text in each grid cell, this solution is not ideal because program descriptions may still be truncated.

A similar problem arises with electronic program guides as the time slots change. Typically, 90 minutes of schedule information is displayed at one time and at every half-hour, the 90 minute window shifts ahead by 30 minutes. In the case where a 30 minute shift causes a 30 minute size grid cell to display, e.g., a two-hour movie, it is likely that the full title of the movie will not fit into the cell. Truncation of the title is thus required in this situation as well. In this case, while two lines of text may be desirable to fit the title in the 30 minute cell, this may not be the case for the 60 or 90 minute cells because there may be sufficient space in these cells to fit the title on a single line.

There thus exists a need for substantial improvements in existing electronic television program guide channels that will make the guides more useful for the viewer and more pleasant to watch, while still meeting the needs of the cable operator in terms of including commercial information in addition to program schedules. Electronic program guide channels represent a potentially useful tool for the viewer as well as a source of revenue for cable operators, but it is believed that current program guides are being under-utilized because of the aforementioned drawbacks with these systems.

Accordingly, there exists a need for an improved technique of displaying program information in order to make program schedule grids more readable.

There also exists a need for an improved technique of displaying program information and associated commercial information in order to reduce the cycle time for displaying the complete schedule of program information.

There also exists a need for providing a more aesthetically pleasing display environment for the program schedule information.

There also exists a need for providing more flexible display formats for the program schedule information that can be readily altered and interchanged by the cable operator.

There is also a particular need for an improved display of text in the cells comprising the program schedule grid.

Accordingly, there exists a need for a electronic program guide which can provide improved display of program listings and video promotions in a manner that does not detract from the utility of the program guide.

For example, there is a particular need for a flexible program schedule system that allows the cable operator to broadcast full screen displays of program schedule information as well as partial screens of program information together with promotional and other commercial information.

These as well as other problems and drawbacks of existing electronic program guides are solved by applicants' improved electronic program guide channel system and method.

It is accordingly an object of the present invention to provide a electronic television program schedule system wherein pages and partial pages of program schedule information fade in and out on the viewer's display.

It is another object of the present invention to provide a system which can interchangeably display a full screen of program listings or a partial screen of program listings.

It is a further object of the present invention to provide a system which can switch between a display of program listings and display of a received video or text message.

It is a further object of the present invention to provide a system which can alter the portion of the page display occupied by program listings depending upon the content of a received message.

It is a further object of the present invention to provide a system which can switch between a full page listing display and partial page listing together with a message.

It is a further object of the present invention to provide a system which can switch between a full page listing display and partial page listing together with a message, wherein the portion of the page used for program listings is determined by the content of the message.

It is another object of the invention to provide a electronic television program guide with variable background views.

It is another object of the invention to provide a electronic television program guide with variable background views that change according to time of day.

It is another object of the invention to provide a electronic television program guide with background views that are determined by current events or events upcoming in the near future.

It is another object of the invention to provide a electronic television program guide with background views that are determined by current holidays or holidays upcoming in the near future.

It is a further object of the invention to provide an electronic television program guide wherein varying grid cell sizes are provided with associated, varying length program titles.

It is a further object of the invention to combine an electronic television program guide channel with an interactive program guide system so as to provide user control over the display of listings information in an electronic program guide channel environment.

These and other objects of the invention are achieved by an electronic program schedule system which includes a digital receiver and demodulator for receiving and demodulating digital data transmitted, e.g., via satellite, comprising television program schedule information and promotional material, and a digital playback system for storing the data, retrieving the data, and forming pages of television program listings and promotional material for transmission to viewers via a cable television system. The playback system includes a data processor that stores in a disk storage memory apparatus television program schedule information for a plurality of television programs to appear on the plurality of television channels. The data processor also stores in disk storage memory apparatus promotional material for display in association with the schedule information. A multimedia generator receives control commands from the data processor as well as program schedule information and promotional information from the memory and displays a portion of the program schedule information in grid format. The data processor controls the multimedia generator with video control commands, issued in accordance with software resident in the data processor to display program schedule information either in full page format or in partial page format together with promotional information. In addition, the control commands cause the multimedia generator to fade program listings in and out, alter the background upon which the program listings are overlaid, and display varying textual descriptions of television programs so as to fit within a designated grid cell. The pages are modulated by a cable television channel modulator and transmitted on a dedicated cable channel to viewers. A television receiver is used to display the pages by tuning the cable converter box or television tuner to the proper channel.

In an alternate embodiment, the disclosed electronic program guide channel may be combined with an interactive program guide, implemented in the cable converter box.

BRIEF DESCRIPTION OF THE DRAWINGS

FIG. 5b shows a simulated full page display of an embodiment of the invention herein.

FIG. 5c shows another simulated full page display of a preferred embodiment of the invention herein.

FIG. 7b shows a simulated promotional page display with small promotional windows.

FIG. 7c shows another simulated promotional page display with small promotional windows.

FIG. 11a is an example of the operation of the text fit system.

FIG. 11b is an example of how current electronic program guide channel systems truncate program titles.

DETAILED DESCRIPTION OF THE PREFERRED EMBODIMENT

System Configuration

Figure 1:
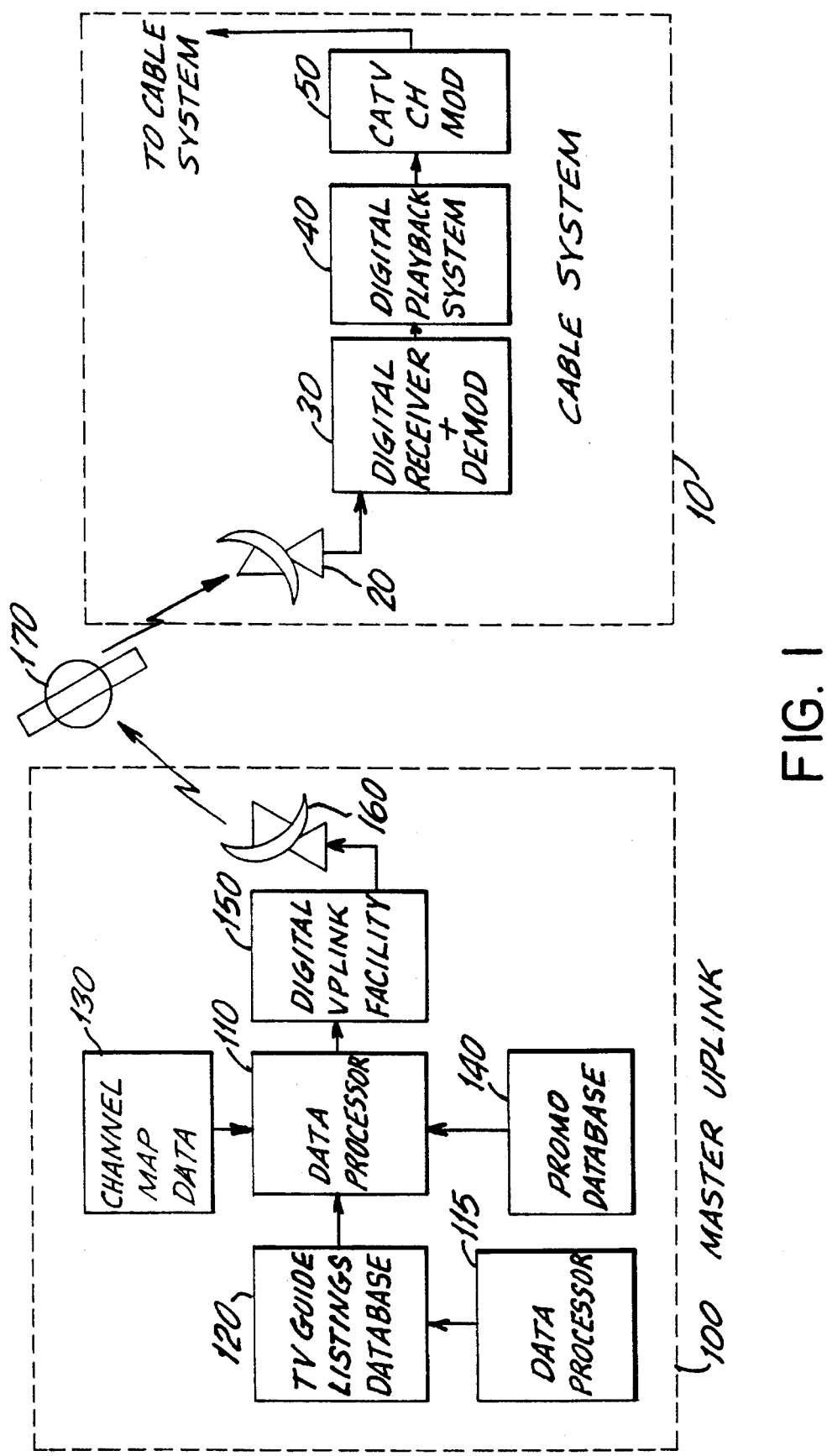
FIG. 1 is a block diagram showing various components of a preferred embodiment of the invention herein.

FIG. 1 is a block diagram showing various components of the electronic program schedule system of the illustrated embodiment of the invention. The system includes cable system equipment designated as 10 that is normally located at the head-end of a cable television system. Preferably there would be numerous installations of the cable system equipment 10 located at various cable system head-ends. Satellite receiver 20 receives digital signals transmitted via satellite 170. The master uplink installation 100 includes satellite transmitter 160 for transmitting digital data comprising television program schedule information and promotional material. It will be understood that there are numerous ways to transfer the digital signals from uplink 100 to cable head-end 10, including telephone lines and by transferring the signals to a storage medium, such as a computer disk or optical storage device. A satellite uplink is a preferred embodiment as it readily permits transmission to any number of cable systems and updating of such information on a frequent or as-needed basis.

All television program schedule and promotional data is compiled at the master uplink installation 100. Data processor 110 processes the various data including the program schedule listings stored in database 120, channel map data stored in database 130, and the promotional information stored in database 140. Text fit data processor 115 provides a computer system for editing the program schedule listings descriptions so that they may fit in different size display cells, and is described later. Listings database 120 contains the program listings for all cable networks, local stations (including their affiliated network programs), in addition to pay-per-view events. Because each cable system may carry a particular cable network on a different channel, listings for cable networks are compiled according to the name of the cable network, as these designations are common to all cable systems. Listings for local stations are compiled according to the station call letters and include local content programs such as news shows, syndicated programs and affiliated network feed programs. In addition, local cable programming channels, such as community access channels must also have their schedule information contained in the listings database. The channel map database 130 contains information specific to each cable system, such as the number of channels and the cable channel onto which each cable network, local station or pay-per-view channel is modulated. In some cases, networks or cable channels have multiple time zone feeds which must be properly tracked. In addition, information relating to shared channels, where cable networks have been allocated broadcast rights by the cable operator according to the time of day, are stored in the channel map database.

Promotional database 140 includes promotional material to be displayed to viewers in association with program listings. The promotional material, which includes video/audio clips as well as textual information, is digitally stored in compressed format. This material has been provided by the program owners as part of the overall marketing effort to the cable consumer, and may be edited by the electronic program guide provider to optimize use in the system.

Operation of the master uplink facility may occur in two ways as follows. In the first, all information is preselected for the cable system at the master uplink 100 and sent as a complete package of information to the local cable system 10. In the second, and preferred method, the local cable system is sent channel map and promotional schedule information only and then locally filters (captures) the required listing and promotion material from a continuous feed of all material from the master uplink 100 via satellite 170.

Figure 2A:
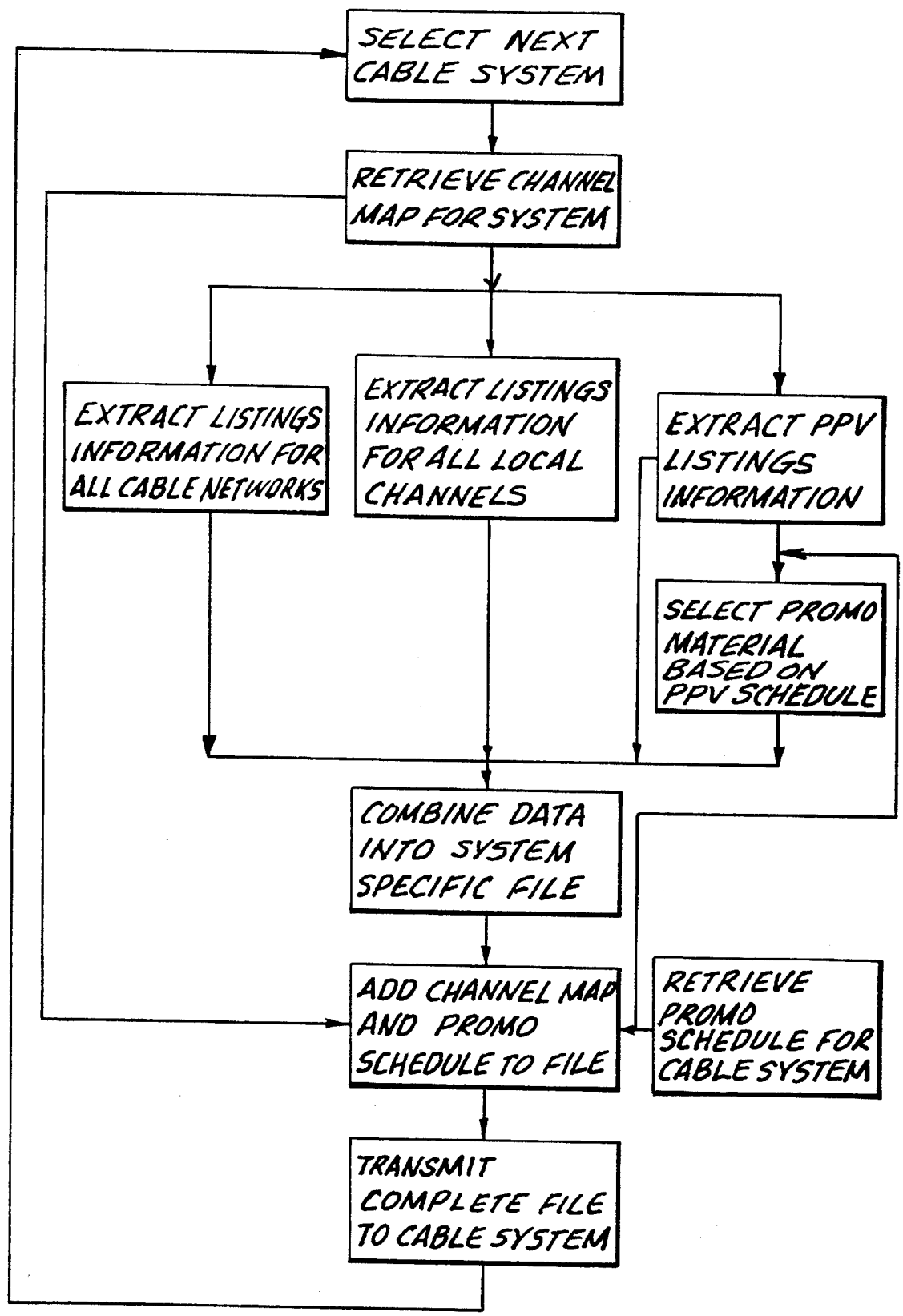
FIG. 2a is a flow chart showing one method of operation of master uplink facility.

In the first method, data processor 110 stores a list of all participant cable systems. At a predetermined time, processor 110 selects a particular cable system and retrieves the channel map information from database 130. Using the channel map data, processor 110 extracts from listings database 120 the program schedule information for all cable networks and local stations in the cable system and matches the listings data with the appropriate channel for the cable system. For example, the channel map data would indicate that on a particular cable system the Cable News Network is broadcast on channel 4. Processor 110 would than extract the program schedule information for CNN and assign it to channel 4. Local television station or pay-per-view channel schedules for the same system would also be extracted in a similar fashion. FIG. 2a is a flow chart that shows the process of forming a complete database of schedule information, including program listings, promotional material, and channel map data for each cable system. After selecting a cable system, data processor 110 retrieves the channel map for the system and then extracts program listings information for cable networks, local channels, and pay-per-view events. In addition, promotional material is selected based on the pay-per-view listings. The data is then combined into a cable system specific data file to which the channel map and promotional schedule for the cable system is added.

Processor 110 stores the schedule for display of promotional material for each cable system which includes information concerning the date, time, and frequency of display of the promotional material designated for display on a particular cable system. Based on this schedule and the pay-per-view listings, processor 110 extracts promotional material from database 140 for transmission to cable head-end 10.

Once the processor has compiled all of the data for a particular cable system, the data is packetized and, together with the address header for the designated cable system, is uplinked to satellite 170 through digital uplink facility 150 and transmission antenna 160. The processor then repeats the above extraction and compilation procedure for each participating cable system so that the uplink facility 100 sequentially transmits data for each cable system. The entire process is repeated periodically, as the program schedule and promotional information is updated. The frequency of transmissions from the master facility can of course be different for each cable system. Updates and changes to the program schedule information are made at the master uplink facility and then transmitted to the participant cable system. Updates may occur weekly, daily, or evenly hourly depending on the particular cable system and the frequency of updates at the master uplink.

Figure 2B:
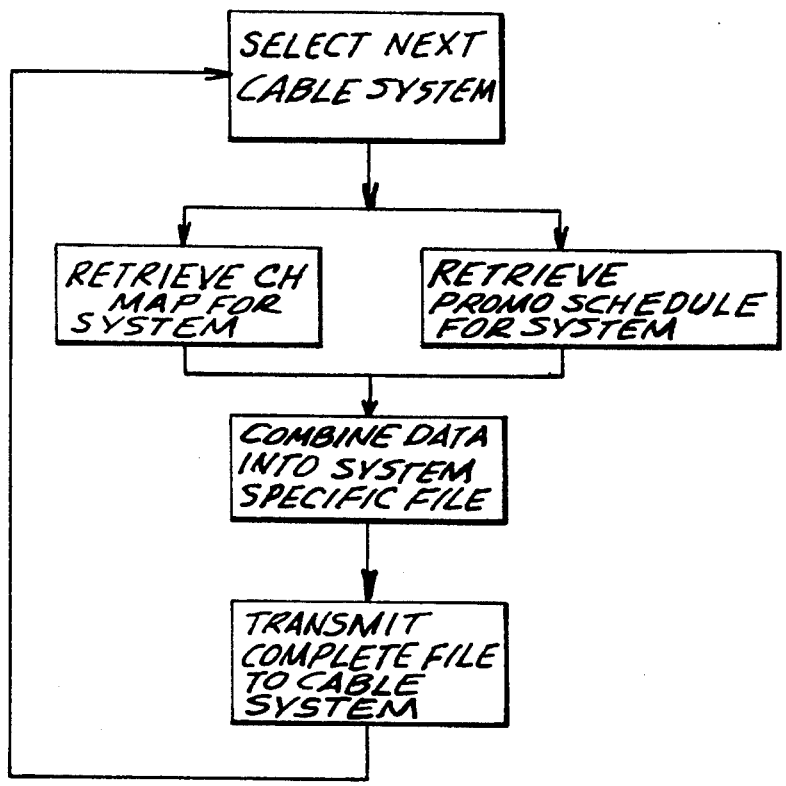
FIGS. 2b and 2c are flow charts showing another method of operation of master uplink facility.
Figure 2C:
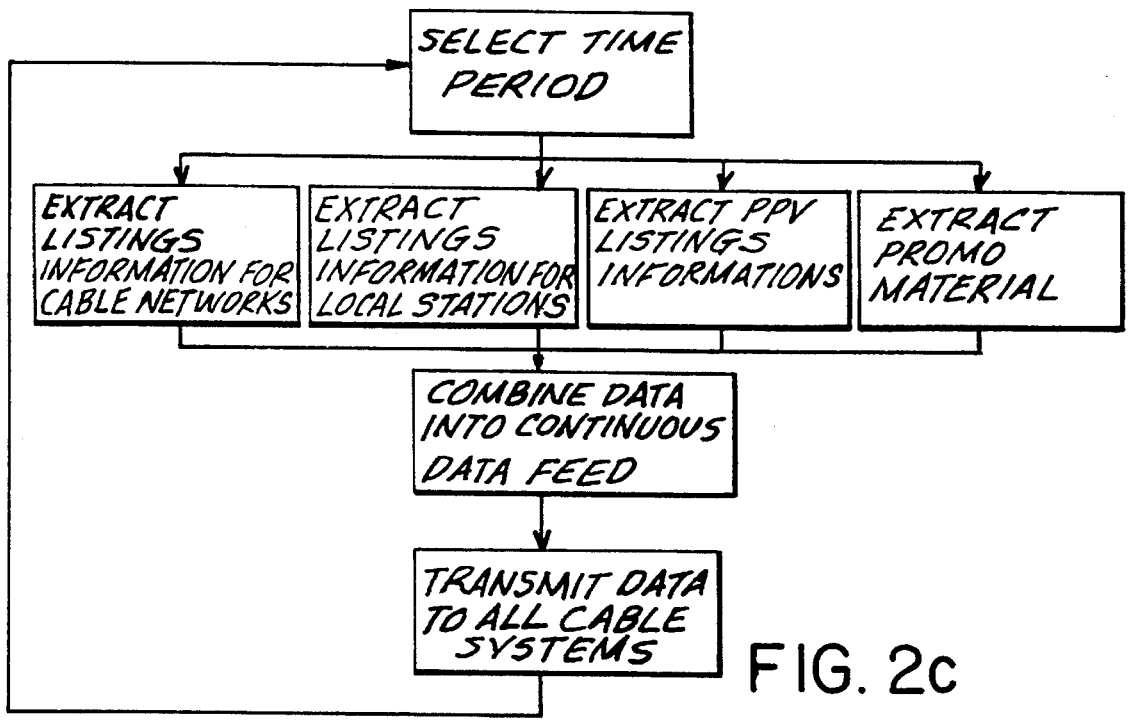

In the second method of transmission to the cable headends, only the promotional schedule and channel map for each cable system is transmitted and received as described above. This process is shown in FIG. 2b. The master uplink continuously transmits all cable systems listing and promotional information on a regular basis. The complete listing information would be cycled on, for example, a 12 hour basis. Program schedule updates, or new promotional information could be transmitted more frequently, say on an hourly basis. This process is shown in FIG. 2c. The digital receiver 30 then monitors the transmitted digital signals from master uplink 100 looking for only the cable networks, local stations or pay-per-view channels which it requires for its channel map. This information is then passed on to the digital playback system 40 for storage. Real time updates for last minute changes, such as a sporting event going longer than originally scheduled could be supported in this second method, where it would be impractical to send them individually to each local cable system using the first method.

Figure 3:
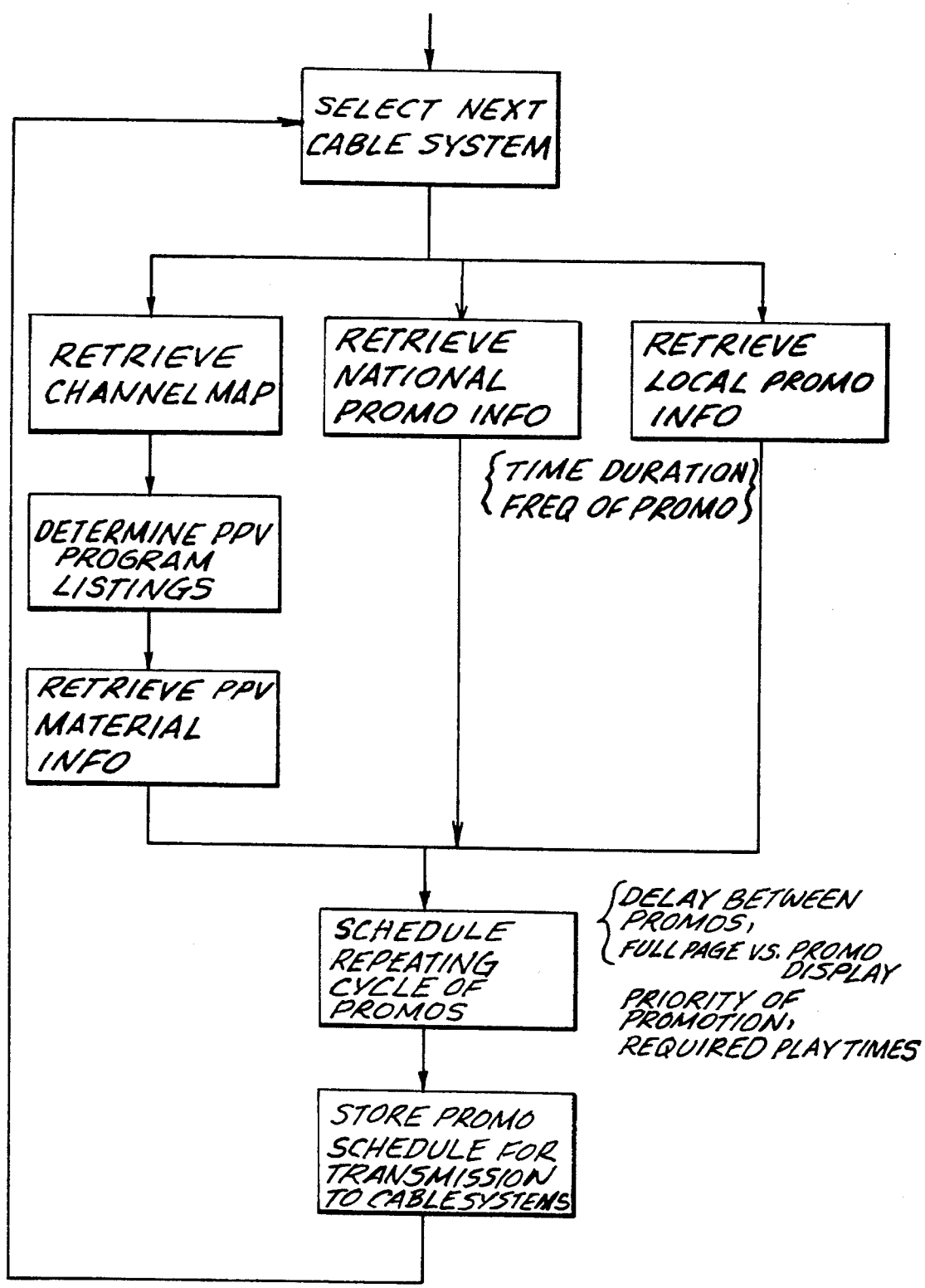
FIG. 3 is a flow chart showing the process for formation of a promotional display schedule.

Data processor 110 forms a schedule for the display of the promotional material for each cable system as follows: FIG. 3 is a flow chart illustrating the process by which a promotional schedule is formed. First, data processor 110 retrieves channel map data, national promotional information, and local promotional information (including the duration and frequency of promotions). Based on the channel map data, pay-per-view program listings are reviewed and promotional material for these listings is retrieved. This data is combined with the schedule for repeating promotion cycles, which includes the delay between promotions, whether a full page of listings or promotional information is to be displayed, the priority of promotions, and the required play times for promotions. The result is a complete promotion schedule database.

At the cable system head-end 10, reception antenna 20 receives the signals transmitted via satellite 170 and routes them to digital receiver and demodulator 30. Digital receiver analyzes the incoming data to determine if its address matches the address for the cable system. When a match is detected, the data stream is routed to digital playback system 40, which is shown in block diagram form in FIG. 4.

Once the schedule, listings and promotional information has been received by either method, the operation of the electronic program guide is the same.

Figure 4:
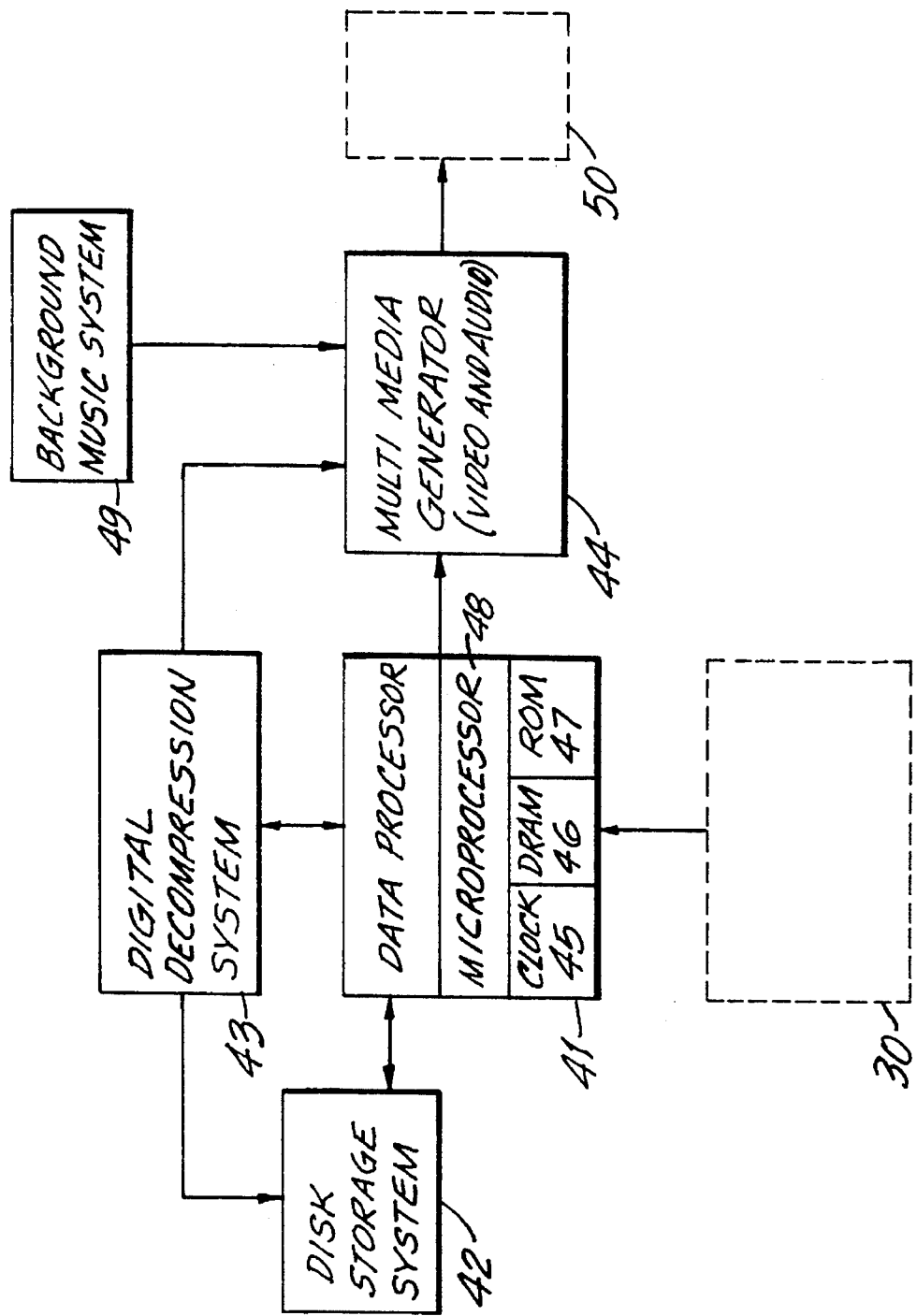
FIG. 4 is a block diagram showing the various components of a preferred embodiment of the digital playback system of the invention herein.

As shown in FIG. 4, digital playback system 40 comprises data processor 41, disk storage system 42, digital decompression system 43, multimedia generator 44, and background music system 49. Program listings, channel maps and the digitally compressed files containing the promotional material are stored in disk storage system 42. The data processor 41 uses the received program schedule information to build a database stored in disk storage system 42. The stored schedule information can be updated on a periodic basis, such as hourly, daily or weekly, or at any time when changes in scheduling or other factors warrant an update. Updates are made by transmissions via satellite from the master uplink facility. The data processor also includes a system clock 45, DRAM memory 46, ROM memory 47 and microprocessor 48. Together these elements comprise a computer system which can be implemented as a commercially available personal computer. Operations at the cable head-end are controlled by software resident on data processor 41 and also stored on disk system 42 for backup purposes. Data processor 41 retrieves program schedule information from disk storage system 42 just before the time it is to be displayed and stores the data in appropriately organized records in dynamic random access memory (DRAM) 46. Promotional material is retrieved from disk system 42, de, compressed by digital decompression system 43, and sent to the multimedia display generator 44 according to a schedule resident on data processor 41, which is the schedule received from master uplink facility 100. Data processor 41 also stores data types such as stored bit maps for the screen configurations and the graphic symbol or logo to be included on the listings and promotional pages.

Data processor 41 supplies the program schedule information to a multimedia generator 44 including audio switching and video display generating capability, which in the present embodiment may be a commercially available VGA-type graphics and sound card, such as a Rocgen card manufactured by Roctec. The multimedia generator includes a standard video generator, which takes the digital program schedule information sent by data processor 41 and converts it to an NTSC video format signal in accordance with the bit map for the particular screen display being presented. The particular multimedia generator utilized is not critical to the invention. Rather than using a VGA graphics card and converting the signal to NTSC format, a multimedia generator with an NTSC graphics card can be used that generates an NTSC signal. Multimedia generator 44 is also capable of selecting an audio source, such as background music system 49 which in the present embodiment may be a commercially available music system such as Digital Music Express (DMX). Alternatively, for cable systems that do not have a DMX system, digital audio fries are transmitted from the master uplink facility and received by the cable systems. Processor 41 controls which screen display is presented and how it is mixed with the output of the digital decompression system 43, including both audio and video signals. The configuration of each type of screen display is shown and discussed in greater detail below. The multimedia generator 44, controlled by commands from data processor 41, composes the pages of listings and promotional material for display and routes the formatted pages to cable television channel modulator 50. Subscribers desiring to view the electronic program schedule listings simply tune their cable television converter box to the proper channel which then demodulates the signal. The process of receiving and displaying the listings information is not described in detail as it is well known to those of skill in the art.

Program Listings Pages

One advantage of the present invention is the flexibility it provides in creating the pages of program listings and promotional information, heretofore unavailable in existing systems. The various display pages generated by the electronic program guide channel system will now be described.

Full Page Display Mode

Figure 5A:
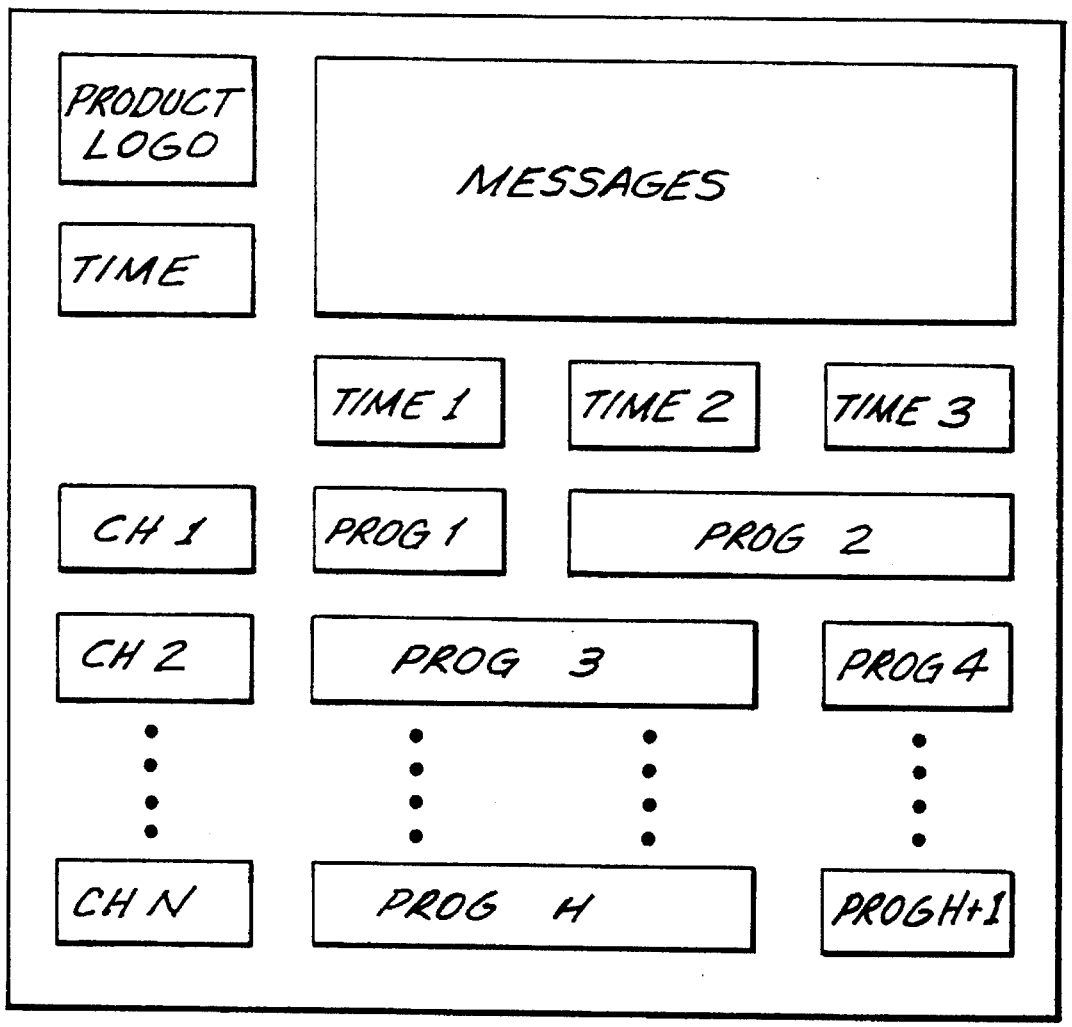
FIG. 5a shows the layout for the full page display mode of an embodiment of the invention herein.

When the system is operating in full page display mode, no promotional material is displayed. FIG. 5a shows the layout of the full page display mode of the present system. In the top left-hand corner, space is provided for display of a product provider (such as TV Guide), cable system or multi-system operator (MSO) logo, or both. Current time is continuously displayed on the page. In addition, space is provizted for the display of local or national messages. Such messages may include program listings updates, news flashes, weather information, traffic information, local events and the like. Simulated display pages are shown in FIGS. 5b and 5c. As is shown in FIG. 5a, program listings are displayed in matrix format, with columns representing different time slots and rows different channels. Next to each row of channel listings is the name and number of the channel. In a preferred embodiment of the present invention, four 30 minute time slots are displayed, the first being; the current 30 minute slot, and eight different channels. Of course, different numbers of channels and time slots may be used. It may be desirable to display only six channels at a time to increase the size of the text and therefore the readability of the display. The length of the program determines the size of the cell available for the display of the program title and other information. For example, a 30 minute program is provided with the smallest cell and a 120 minute or longer program the largest. 15 and 45 minute cells may also be used for programs of these lengths. As shown in FIGS. 5b and 5c, if a program began earlier but continues into a currently displayed time slot, the left side of the grid box is formed into an arrow pointing toward the left (past) to indicate that the program began at a time not currently being displayed. Similarly, if a program continues into a time slot in the future not currently being displayed, the right side of the box is formed into an arrow pointing toward the right (future).

In a preferred embodiment of full page display mode, each page of listings shows information for eight channels and is displayed for 10 seconds. After 10 seconds, the page fades out and a new page displaying the next eight channels fades in. In addition, background music system 49 provides background music during display of the listings pages. A fade-in/fade-out means for display of the schedule information is an improvement over existing systems utilizing scrolling listings. With the disclosed fade-in/fade-out method, pages of listings remain constant while they are displayed, eliminating the need for the user to follow a line of listings as it scrolls up or down the screen.

Figure 6:
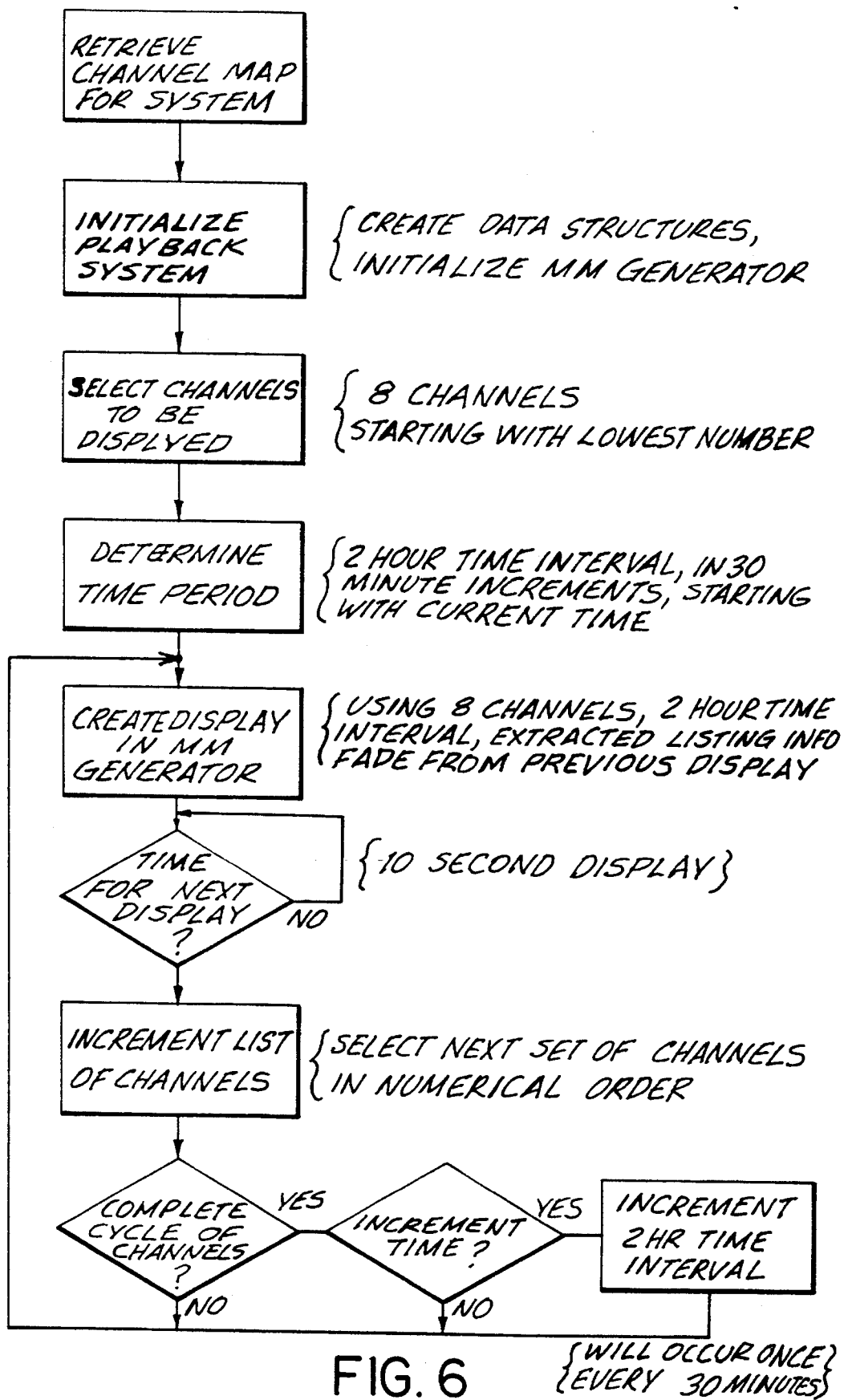
FIG. 6 is a flow chart showing operation of a preferred embodiment of the invention herein when operating in full page display mode.

The full page display mode permits rapid display of all program schedule information for the four time slots. For example, in a cable system with 80 channels, it would take approximately 1.5 minutes to provide the schedule information for all eighty channels, assuming the information for each block of eight channels is displayed for 10 seconds. It will be understood by those of skill in the art that the format of the display, as well as the number of time slots, number of channels, and time of display for each page may readily be varied by modifying the software that controls the data processor 41. FIG. 6 is a flow chart showing the process by which the system operates in full page listing mode. Data processor 41 first retrieves the channel map and initializes the playback system by creating the data structures and initializing the multimedia generator. Next, eight channels are selected for display of listings data, beginning with the lowest number channel. Data processor 41 then determines the proper two-hour time window for which listings will be displayed based on the current time. The particular order of the first four steps is not part of the invention and may be altered. For example, The data processor may first initialize the playback system, then determine the time period, then retrieve the channel map, and then select the channels to be displayed. The two-hour time window will shift every 30 minutes. The processor then issues commands to the multimedia generator 44 to create the display based on the eight channels and two hour time window. The display is maintained for 10 seconds at which time the next set of eight channels is selected in numerical order. When a cycle through all the channels has been completed, the data processor checks the current time to determine if the two hour time window is to be incremented. Alternatively, the data processor may check the current time after each page display and increment the time window without waiting for completion of the cycle. If only six channels are displayed at a time, the total cycle time will of course be greater.

Promotional Page Display Mode

Figure 7A:
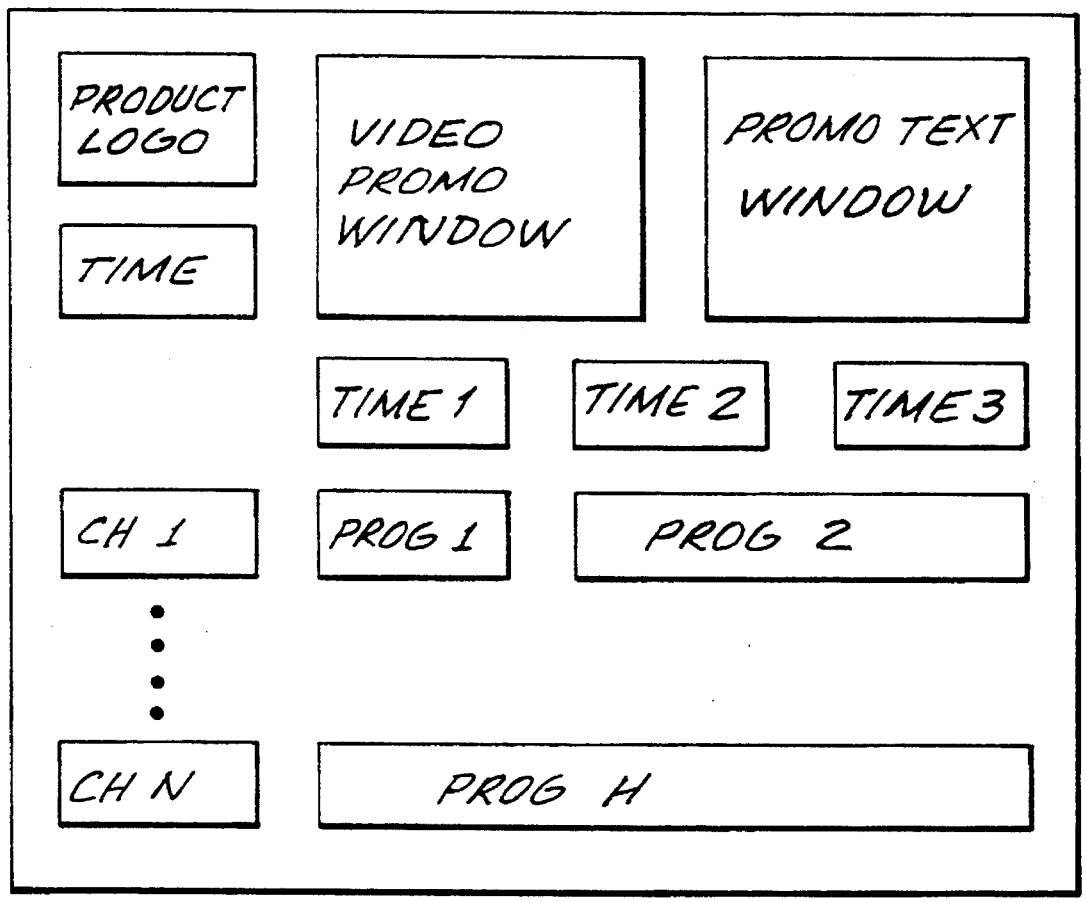
FIG. 7a shows the layout for a promotional page display with small promotional windows.

As discussed above, disk storage system 42 stores not only program schedule listings but promotional information as well. The promotional information is accessed by data processor 41, and converted to audio and a video window by decompression system 43, while the system is in promotional page mode as described herein. A typical layout for a promotional page with small promotional windows is shown in FIG. 7a. The layout is similar to that for the full page mode, with the exception that there are fewer channels displayed at one time because the top portion of the display contains a video promotion window and an associated text window. The video and text windows replace the messages furnished with the full page of listings. For example, the video window may display a movie clip for an upcoming pay-per-view movie, the text window may contain schedule, price, and ordering information for the movie. FIGS. 7b and 7c show simulated promotional page displays with small promotional windows. The same display format may be used for the display of large promotional windows, except that fewer channel listings are displayed at the same time. Depending on the desired size of the video window, data processor 41 determines how many channel listings to include on the bottom portion of the screen as to be described in further detail below. In a preferred embodiment, the same fade-in/fade-out method for changing listings is used while the video and text windows are continuously displayed in the top portion of the screen. The promotional video has a corresponding audio soundtrack which is substituted for the background music by the multimedia generator during the video playback.

In one embodiment of the present invention the size of the video and text windows may be an entry in the promotional display schedule, so that data processor 41 determines the size of the windows when retrieving the promotional information. Alternatively, the size of the video and text windows may be determined by a header in the data file with the video and textual data. For example, the header may include a code that is read by data processor 41 and indicates that one-half page should be used for display of the video and text windows. The computer then determines how many rows of program listings to include with the promotion and selects the proper bit map from memory and issues appropriate commands to the multimedia generator 44 for generation of the page displays. It is apparent that much flexibility is accorded by this system. For example, advertisers may be charged different prices depending on the size of the video and text windows.

There are many variations from the basic page format that can be easily implemented by those of ordinary skill in the art. For example, the listings may be color-coded to distinguish basic channels, premium channels, and PPV events. In this manner, the viewer can quickly discern whether a program shown in the grid listings is available to him or her or whether it is a PPV event. In addition, color-coding can be used to identify different categories of programs such as movies and sports events.

Although typically two lines of text is adequate for the grid listings, for certain programs it may be desirable to provide an additional line of text in the grid box. One example is a cable system where viewers must phone the system operator if they desire access to a PPV event. In this situation, a third line of text can be used to display the phone number to be called to receive the PPV event. In order to accommodate grid boxes with three lines of text, the data processor must of course be program, accordingly. Using three lines of text in a grid box will decrease the number of channels that may be displayed in either the full or promotional page display modes. Based on experience to date, there is a minimum required page display time of 7–10 seconds for readability. Therefore, the total time required to complete one cycle through all the channel listings will increase. Alternatively, the data processor can be programmed to decrease the display time of pages with a reduced number of listings. For example, the per page display time can be a fixed multiple of the number of channels being displayed.

System Operation

Figure 8:
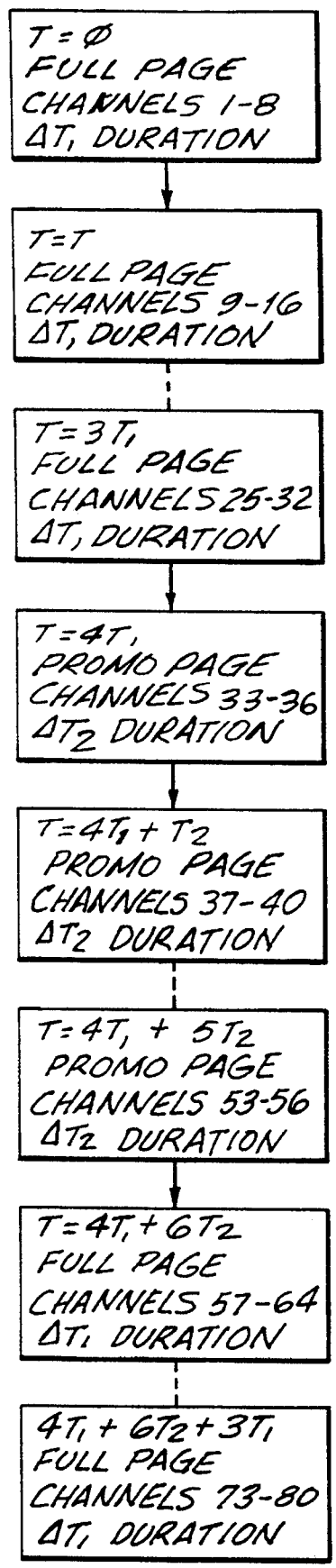
FIG. 8 shows a typical sequence of display pages of one embodiment of the invention herein.

A typical sequence of display pages as controlled by the data processor 41 is shown in FIG. 8. In the figure, T represents time and $\delta T$ represents an increment of time. As shown in FIG. 8, at T=0, data processor 41 sends commands to multimedia generator 44 to produce a full page of listings (channels 1–8). After an increment of time $\delta T_1$, the listings fade and at T=$T_1$, listings for channels 9–16 fade in. Similarly, after two more intervals of $\delta T_1$, the display has cycled through the program listings for channels 1–32. At T=$4T_1$, the program listings fade and instead of fading in a full page of program listings, a promotional page is faded in including a video window, text window, and only four channels of program listings. As indicated above, the proportion of the page used for display of program listings may be determined by data processor 41 based on the header in the file containing the video clip which controls the size of the promotional video and text windows. It will be apparent to those of ordinary skill in the art that the sequence may be readily modified if only 6 channels are displayed at a time.

The promotional windows are treated by data processor 41 as messages. When the stored promotional schedule indicates it its lime to display promotional windows, processor 41 sends a message to multimedia generator 44 in the form of a command to display the designated promotional windows. The multimedia generator then forms a promotional page by combining the promotional windows with program listings. The number of channels displayed is dependent on the size of the promotional windows, as discussed above. The duration of the display of the promotional page, $\delta T_2$, may or may not be the same as $\delta T_1$. In FIG. 8, $\delta T_1$ is 10 seconds and $\delta T_2$ is 5 seconds. Time durations may be determined by the amount of listing information that is displayed on the screen. Four full pages are displayed and then six promotional pages so that full page listings are shown for 40 second„s followed by 30 seconds of promotional pages and then another 30 seconds of full page listings and so on. In an 80 channel cable system it thus will require 100 seconds or approximately 1.5 minutes to display all the listings. It of course will be understood that any number of variations of this scheme are possible. For example, the promotional video and text windows can be changed after the first $\delta T_2$ period. The data processor may also be configured to display promotional windows more frequently during peak viewing hours and display different promotional windows depending on day of the week and time of day.

Figure 9:
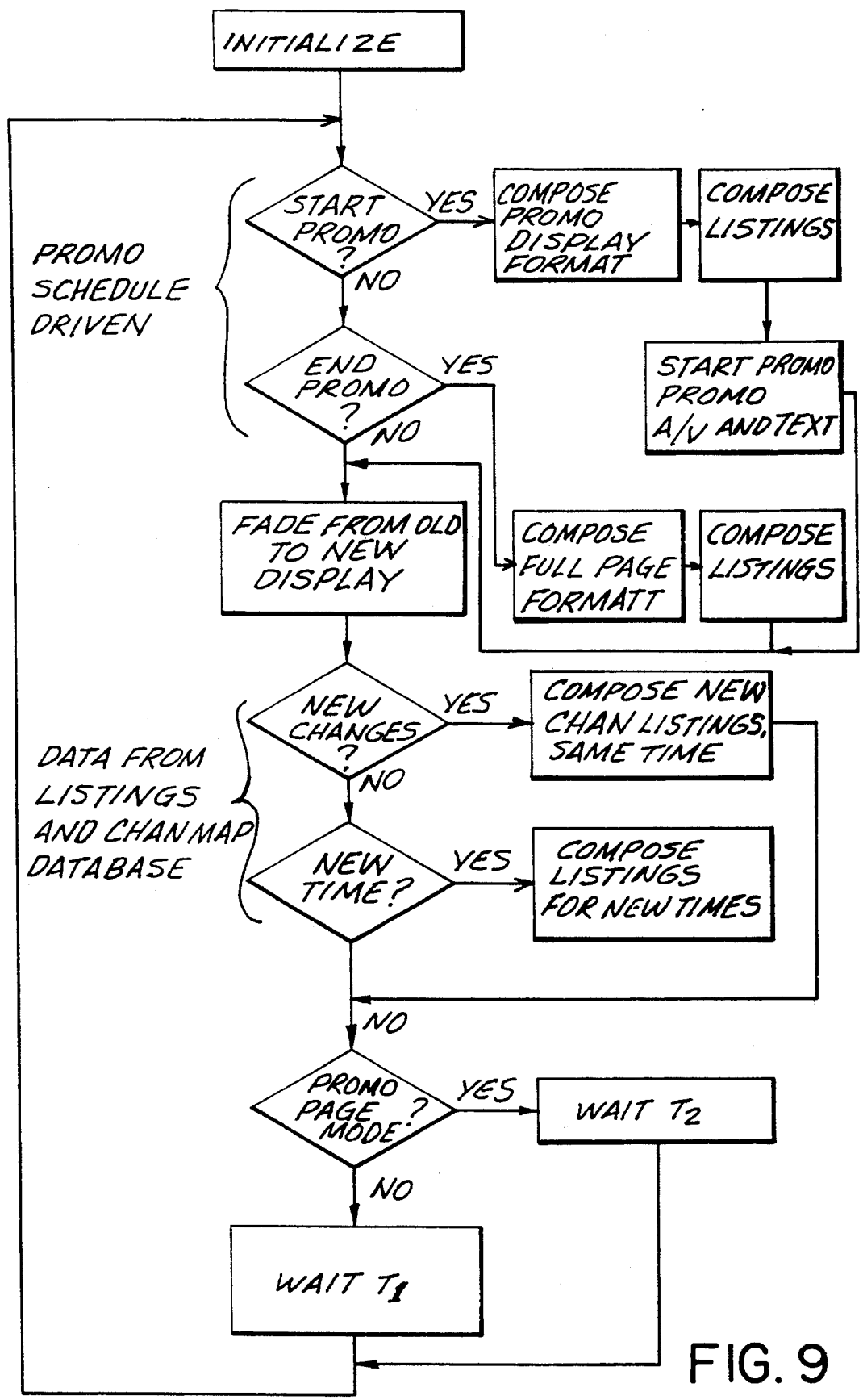
FIG. 9 is a flow diagram showing the sequence of operations of the invention herein when operating under control of a promotional schedule.

An advantage of the present invention is that full flexibility is provided—any number of combinations are possible and each cable system may choose to configure the system differently. The overall logic for determining the commands to be sent to the video display generator by the data processor is shown in the flow diagram in FIG. 9. After initialization, the data processor checks the clock and promotional schedule to determine if promotional video and text windows are scheduled for display. If a promotion is scheduled, data processor 41 composes the promotional page display format and program listings information. If the promotional schedule indicates it is time to end a promotion, the data processor composes the full page format and program listings information. The page then fades from the old to the new display. The data processor then checks the clock to determine if it is time to display the next group of channel listings. If it is, new channel listings are composed for the same time slots. If not, the data processor checks the clock to determine if it is time to display new time slots. If it is, then listings are composed for the new times. Finally, the data processor determines how long to display the current page based on whether a full page of listings or a promotional page is being displayed.

In one embodiment, the data processor at the cable or local system operator location may be programmed to control the display pages so that the process of composing pages, including the promotional material, is fully automated. In this manner, rather than the data processor receiving a pre-determined promotional schedule from the master uplink facility as shown in FIG. 3, it may simply receive a database of promotional clips and generate its own schedule for display of the clips. For example, a rules-based scheduling algorithm may be utilized where each piece of promotional material to be displayed on the guide channel may be controlled using one or more weighting factors. These factors alter the date, time, and frequency of display of each piece of promotional material. The data processor is then programmed to read each of the factors for each piece of promotional material and compile a schedule for display of the promotional material. Using multiple factors affords the system operator much flexibility in controlling the generation of a schedule for display of the promotional material. Video and audio clips of PPV movies are one example of the promotional material that may be scheduled for display by the data processor. The present invention may, however, be used to control the schedule of any type of promotional material, including premium channel and local operator advertisements.

Because PPV movies are aired at pre-determined dates and times, scheduling of the clips for these movies may be critical to successful promotion of the movie. One factor that may be used to control display of the clips is a time weighting factor that alters the frequency of display of the clip for a PPV movie so that the clip is shown more frequently immediately prior to the movie being shown. This factor is based on the assumption that a viewer watching the guide channel to determine programs currently being aired or to be aired in the very near future will want to be informed of a PPV movie about to begin. As an example, it is desirable to display the promotional clips for a PPV movie a high percentage of the time during the 10 minutes immediately preceding the movie. Between 1 hour and 10 minutes prior to the program, it may be desirable to display the clip at a slightly lower frequency. More than one hour prior to the movie, it may be desirable to display the clips at a still lower frequency. This factor may be referred to as the proximity factor since it controls the frequency of display of promotional material based on how far into the future an event is to be aired. The particular points when the frequency changes and the magnitudes of the frequency changes may be easily controlled. The actual frequency with which the clips are displayed will depend on the total number of clips and other promotional material eligible for display at the same time and any other factors used to control the promotional display schedule.

A second factor that can be used to control the display of promotional material is a content-dependent time rating factor. For example, it is likely that promoters of adult programming would not want promotional material for these programs to be displayed on weekday afternoons assuming the television audience at this time is primarily children. It may be desirable to display this type of promotional material only after 11:00 P.M. or midnight. Therefore, it is beneficial to include a factor that restricts the display of certain promotional material to certain times of the day and days of the week in order to target a desired audience. Alternatively, rather than completely eliminating the display of promotional material during designated blocks of time, this factor may be used to adjust the frequency of display accordingly. In this manner, it may function similar to the proximity factor except that frequency adjustments are based on program/promotional material content rather than the proximity of the,, program being promoted.

A third possible factor may be based on the type of promotional material. It may be desirable to display certain types of promotional material more frequently than others so that, in general, higher priority promotional material is always displayed more frequently and during time periods when television audiences are greatest as compared with lower priority material. One possible priority scheme, in descending order, is as follows: PPV events, advertisements for premium services, general commercial advertisements, and local cable or multi-system operator ads. Much flexibility is accorded using a general prioritizing scheme. For example, rather than using the proximity factor to alter the frequency of clips for movies upcoming in the immediate future, a different clip may be used for the ten minute time period immediately preceding the beginning of a PPV movie. These clips may be assigned a relatively high priority since they are only shown during this brief time period.

Another factor may be used as a type of override to "force" a particular display regardless of the particular promotional material being displayed. For example, as discussed above the data processor controls the guide channel so that it switches between full page display mode and partial page display with promotional material. During a period when, for example, it may be desirable to display a large number of clips for PPV events, there may be little or no time available for full page display. However, the system operator may decide that it is frustrating for users to view continuous promotional clips for extended periods of time. Therefore, it may be desirable to "force" the system to full page display mode and override the current display of promotional material. This factor can also be used to force other types of displays and is useful where the system operator has contractual commitments to display certain promotional material at predetermined times.

Finally, a second type of time-weighting factor can be used to promote certain programs more often than others. For example, if market research shows that Saturday nights at 8:00 P.M. is the time slot during which the greatest number of viewers watch PPV movies, it may be desirable to run promotions for PPV movies airing at this time more frequently than other events being promoted. On the other hand, the system operator may decide that because viewership of these PPV events is already high, it may be desirable to promote these movies less frequently to free up promotional time for PPV events in other less popular time slots.

The advantage of using the various aforedescribed weighting factors for generating a schedule for display of promotional material is that it provides the system operator much flexibility in controlling the various promotional material displayed together with the program schedule information. The table below summarizes each of the weighting factors and how they may be used to control the schedule for display of promotional material.

| FACTOR | DESCRIPTION | USES |
|---|---|---|
| 1. Proximity Factor | Controls frequency of promotional clips based on how soon the program being promoted will be aired. | Promote PPV events more heavily immediately preceding the event to attract "channel-surfing" viewers looking for something to watch. |
| 2. Content/ time Factor | Controls day of week and time of day for display of promotional material based on content of program being promoted | -Prevent promotion of adult material when children will most likely be viewing. -Target promotional material according to viewer profiles based on day of week and time of day. |
| 3. Content/ priority Factor | Controls frequency of display of promotional material based on type of promotional material. | Allows for general prioritizing of promotional material. |
| 4. Forcing Factor | Forces display to full page display mode or display of particular promotional material | -Overrides promotional display schedule after certain amount of time. -Provides means for system operator to meet contractual obligations for display of promotional material. |
| 5. Time Weighting Factor | Controls frequency of display of promotional material based on scheduled air time of event being promoted. | Allows systems operator to control frequency of display of promotional material based on schedule of material being promoted. |

The above factors may be used in any of a number of ways to control the schedule for display of promotional material. It is not necessary to use all of the factors—any combination is possible depending on how it is desired to control the schedule. Some factors may be configured to permit the system operator to set the value. Others may simply be turned on or off. In addition, factors may be assigned default values which can be overridden by the operator. For example, the proximity factor may be programmed so that the system operator simply decides whether or not to use it to adjust the frequency of displays of promotional material based on how far in the future the program is scheduled. The data processor will then automatically determine when to change the frequency of display and by how much.

The content/time and content/priority factors may be used in conjunction with each other as both are based on the content of the promotional material. The system operator (or guide channel operator) can assign a priority—such as a number—to each category of promotional material. Based on the assigned priority number, the data processor may be programmed both to control when certain categories of material are displayed and also to prioritize the different categories of material to control the frequency of display of the different categories.

Promotional Schedule Generation

There are numerous ways in which the above factors may be used to generate a schedule for display of promotional clips. One fairly simple embodiment may be implemented in Microsoft Windows using Visual C++ as follows. In this embodiment, a single priority factor is used for each promotional clip. The various weighting factors are then used to alter this priority factor. First, a database of promotional material is received and each piece of promotional material is ordered according to the possible periods during which it may be played. For each clip, the database includes an indication of the program type, clip type, the time periods when the clip may be shown, and also possibly the scheduled air times of the program being promoted. Including the scheduled air times of the programs being promoted facilitates use of the proximity and time weighting factors. The content/time and forcing factors may be used to indicate in the database records for appropriate clips time periods when the clips should not be aired and time periods when they must be aired, respectively. For other clips to which neither the time/content nor forcing factors apply, the record will simply indicate that all time periods are valid periods during which the clip may be played. Thus, a file may be automatically generated listing one or more time periods during which each promotional clip may be played.

Each promotional clip is listed in a separate file record and is initially assigned a priority according to the type of clip. Certain categories may be assigned higher priorities than others, thus incorporating the content/priority factor. For example, a clip that must be shown in a particular time slot should be given the highest priority. Similarly, a clip that is restricted from being played in certain time slots should also be given a high priority. The system operator may generate a promotional display schedule by selecting a time period for which it is desired to create a schedule. The data processor forms the promotional display schedule by starting with the first block of time within that time period and determining which promotional clip to display. The length of the different promotional clips will vary, but for the first slot, the data processor may simply be set to a default value of, i.e., 30 seconds. The clip file is then searched to determine eligible clips for the chosen time slot.

The clip chosen by the data processor for a particular time period is the one with the highest priority. When an eligible clip is chosen, its priority is decremented by a predetermined amount. Similarly, if an eligible clip is not chosen, its priority is incremented by a pre-determined amount. The decrement and increment values may be different for different categories and thus may also be used to prioritize different types of clips. In addition to being assigned a high initial priority value, high priority clips may also be assigned a high "not chosen" change in priority and a low "chosen" change in priority. The data processor may also be programmed so that the same clip does not play in two consecutive time slots. Ties between candidate clips may be resolved simply by choosing the first eligible clip in the file. Alternatively, ties can be resolved according to which category of clip has the higher priority. A minimum time slot may be defined so that if a clip is shorter than the minimum time, the data processor defaults to full page mode and displays the full page of program listings for the duration of the time slot. After a time slot is filled, the data processor checks the eligible candidates for the next time slot which begins immediately after the end of the previous clip, or, if the previous clip is too short to fill the minimum time, after the minimum time.

Implementing the promotional schedule control system in this manner affords the system operator much flexibility and control over generation of the promotional schedule. The database record for each clip may further include the scheduled air times of, e.g., the PPV movie being promoted. In this manner, it is possible to utilize the proximity factor as follows. When compiling a list of eligible candidates for a time slot, the data processor can check each clip and determine the scheduled time for the program being promoted and increase the priority factor if the time slot is close to the scheduled time for the program. This will have the effect of increasing the probability that the clip will be chosen for display in the slot or slots for which the proximity factor is utilized. Inclusion of the scheduled air time of the program being promoted in the record also permits use of the time weighting factor. For example, if the system operator decides that all PPV programs scheduled for 8:00 P.M. on Saturdays should be promoted more heavily, the data processor can simply search the promotional clips and increase the priority factor of all these clips by a pre-determined amount. Of course, it is also possible to promote particular programs more heavily simply by assigning the particular promotional type or individual promotional clip a high initial priority, a low "chosen" decrease in priority and a high "not chosen" increase in priority.

Generation of the promotional schedule in this manner also permits use of the forcing factor. For example, the data processor can be programmed to monitor how frequently and for how long the guide channel system is being scheduled for full page display mode. If the majority of promotional clips are shorter than the length of the time slot, the schedule generator will frequently be displaying a full page of program listings. If, however, the clips tend to fill the entire time slot, the data processor may be programmed to in effect override the schedule generator and schedule full page display mode. Alternatively, full page mode may be treated as another type of promotional clip competing with the other clips for scheduling. The frequency of full page display mode can then be increased by assigning it a high initial priority, a low "chosen" decrease in priority and a high "not chosen" increase in priority.

Figure 13:
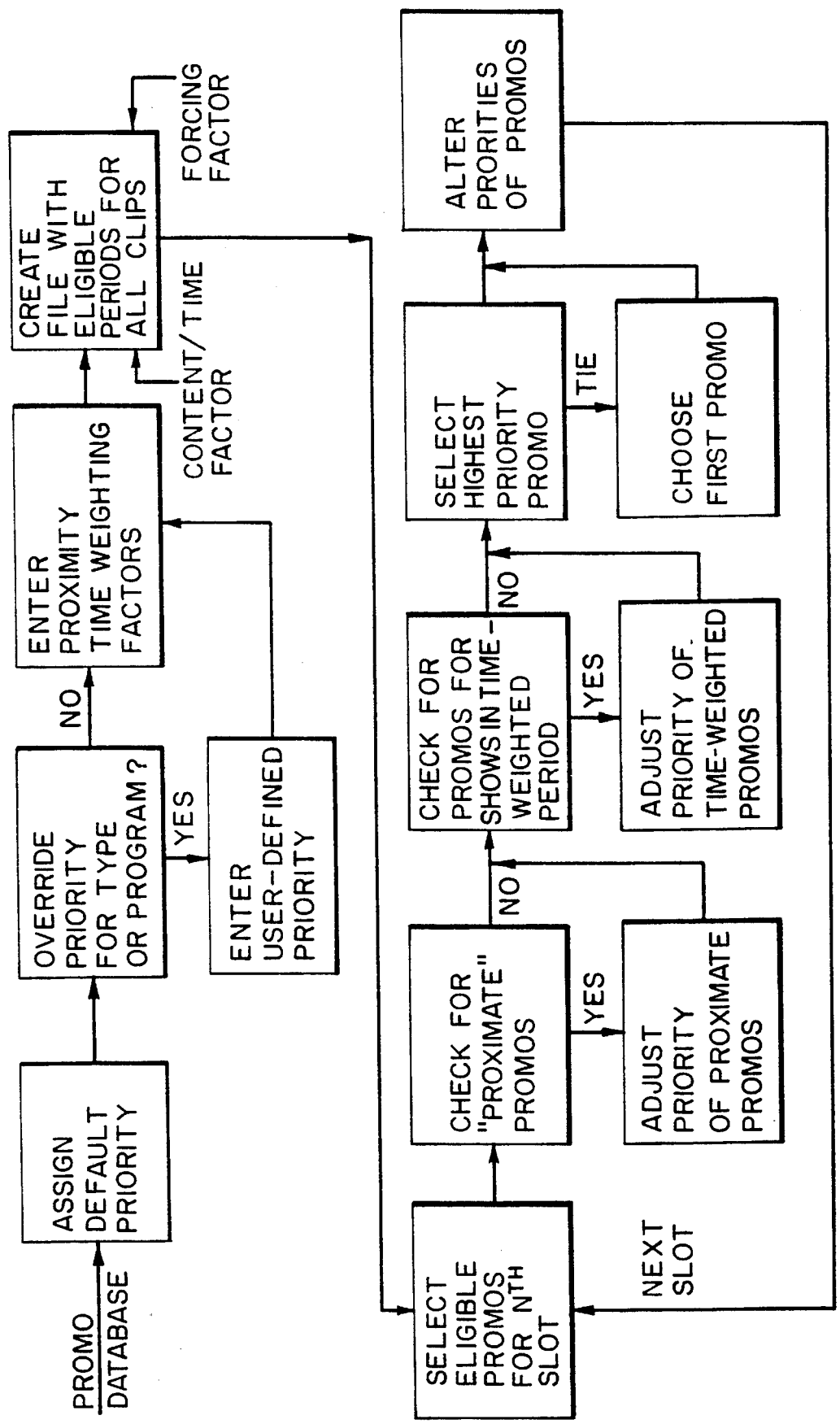
FIG. 13 is a flow chart showing the steps used in creation of a schedule for display of promotional clips.

FIG. 13 illustrates the aforedescribed process in flow chart form. Upon receiving the promotional database, the data processor assigns the default priorities and the "chosen" and "not chosen" priority changes for each clip based on the clip type. Next, the operator may be queried whether to override any of the default settings for either a clip type or an individual clip. The operator is then queried as to whether to use the proximity and/or time weighting factors. The user may then input the changes in initial priority and/or the "chosen" and "not chosen" priority changes for each factor. The database is then used to create a file with the eligible play periods for all clips. The data processor may now begin generating a schedule for a time period specified by the operator. All eligible clips for the first time slot are identified. Next, if the proximity factor is being used, the time slot is compared to the schedule of the program being promoted by each clip. If any of the programs with eligible clips are found to be within the pre-determined proximity to the slot time, the priorities and/or the "chosen" and "not chosen" priority changes for these clips are adjusted by the amounts set by the operator. Similarly, if any of the programs are found to be within the pre-determined time slots the operator wishes to promote more heavily, the priorities and/or the "chosen" and "not chosen" priority changes for these clips are adjusted by amounts set by the operator. Finally, the data processor determines which clip has the highest priority for the time slot and selects this clip. If there is a tie, the first clip is selected. The priority of the selected clip is then decreased by the pre-set amount and the priorities of the non-selected clips are increased by the pre-set amounts. The data processor then repeats this process for the next time slot.

It can be seen that forming the promotional schedule in this manner provides the operator much flexibility and control over the resulting schedule. It will be apparent to those of skill in the art that there are many other ways to generate a promotional schedule using the aforedescribed factors.

Mood Backgrounds

The software resident on data processor 41 may also include a schedule for the display of varying background views upon which the program listings are overlaid. The purpose of the background views or "mood" backgrounds is to help ease the monotony of viewing program listings. The background views are stored as bit maps in data processor 41. For example, data processor 41 may be programmed to issue a command to multimedia generator 44 every morning at 6:00 AM to display a sunrise in the background. The background may then be changed accordingly throughout the day to, for example, a blue sky or a nighttime view (as shown in FIGS. 5*b* and *c*). The background views may also vary by, e.g., day of the week, month, season, or year. Alternatively, the mood background may also be adapted to display scenes that reflect the geographic location of the cable system, or standard scenes such as an ocean or forest may be displayed. In addition, different background views may be used for holidays and special events, such as Christmas, Fourth of July, Superbowl Sunday, etc. It is also possible to incorporate background views that relate to a particular promotional window that is being displayed.

Text Fit System

One of the novel features of the disclosed invention is the text fit system. A preferred embodiment of the text fit system includes an interactive computer program used to edit the program listings data before it is stored in the program listings database 120 as well as software resident in the data processor 41. The interactive portion of the text fit system operates as follows: unedited (or partially edited) program listings information is loaded into text fit data processor 115. The data includes program titles, program schedule times, duration, category, as well as additional descriptive information dependent on the type of program. For example, for movies the data includes the Motion Picture Association of America (MPAA) rating, the reason for the rating—violence, nudity, etc., year of the movie, whether it is in black and white, story line information, and a list of starring actors and actresses.

Figure 10A:
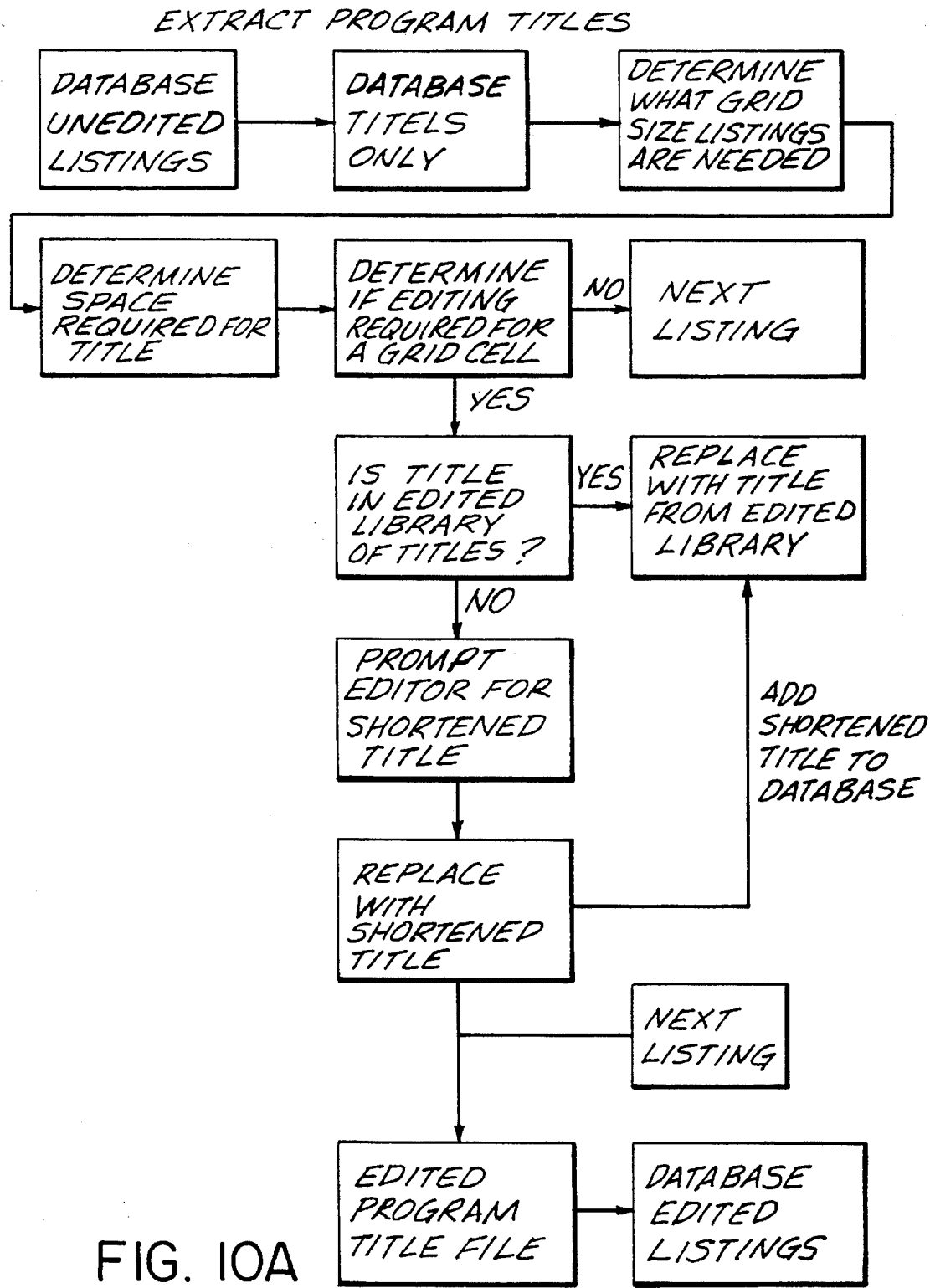
FIG. 10a is a flow chart showing the operation of a preferred embodiment of the title editing portion of the text fit system of the invention herein.

FIG. 10*a* is a flow chart showing the operation of the interactive portion of the text fit system. Data processor 115 extracts only the program title data which includes television program titles as well as movie titles, sporting event titles and titles for other special events. Based on the duration of the program, data processor 115 first analyzes the listings data to determine what grid size listings are needed for each title. Thus, a two hour movie could require four different edited titles to fit into each of the four different size grid cells (30, 60, 90, 120 minutes). Data processor 115 then determines how much space is required to display the title based on its character length. If the title is to be displayed in the program schedule grid using a proportional font and character to character kerning, the data processor may also account for these factors in determining the space required to display a title. The space determination would then be based on the number of pixels required for the particular combination of characters in the title. The amount of space available for display of a title depends on the size of the grid cell which in turn depends on the duration of the program and the present time.

If the data processor determines that a full title requires too much space to fit into one or more grid cells, the title is then presented to the editor using a suitable display device connected to the data processor, such as a CRT. The editor is then queried to alter the title so that it will fit in the allotted space. If the title must be edited for more than one cell size, the editor is queried to edit each of these separately. In a preferred embodiment of the interactive program, the editor is shown in real time, as the title is being edited, whether the edited title will fit in the designated grid cell.

In a preferred embodiment of the disclosed electronic program guide, two lines of text are displayed in each grid cell of the program listings, three lines for PPV movies. The title, as edited, appears on the first line, and if necessary, continues onto the second line. The decision whether to wrap-around to the second line is based on whether natural breaks exist in the title such as spaces between words, commas, periods, hyphens, etc. These are standard techniques used in word processing software routines. The editor may also be queried to edit a title in the situation where the full title will fit on the allotted two lines, but a hyphen is required because there are no suitable natural breaks in the title.

Prior to querying the editor to shorten a title, the data processor compares the title with a stored library of shortened titles to determine if the title had previously been shortened while editing another listings database. Each tinge changes are made by the editor to a title, the shortened title is added to the library. It is apparent that this process of building a library of shortened titles greatly reduces the manual input required.

Figure 10B:
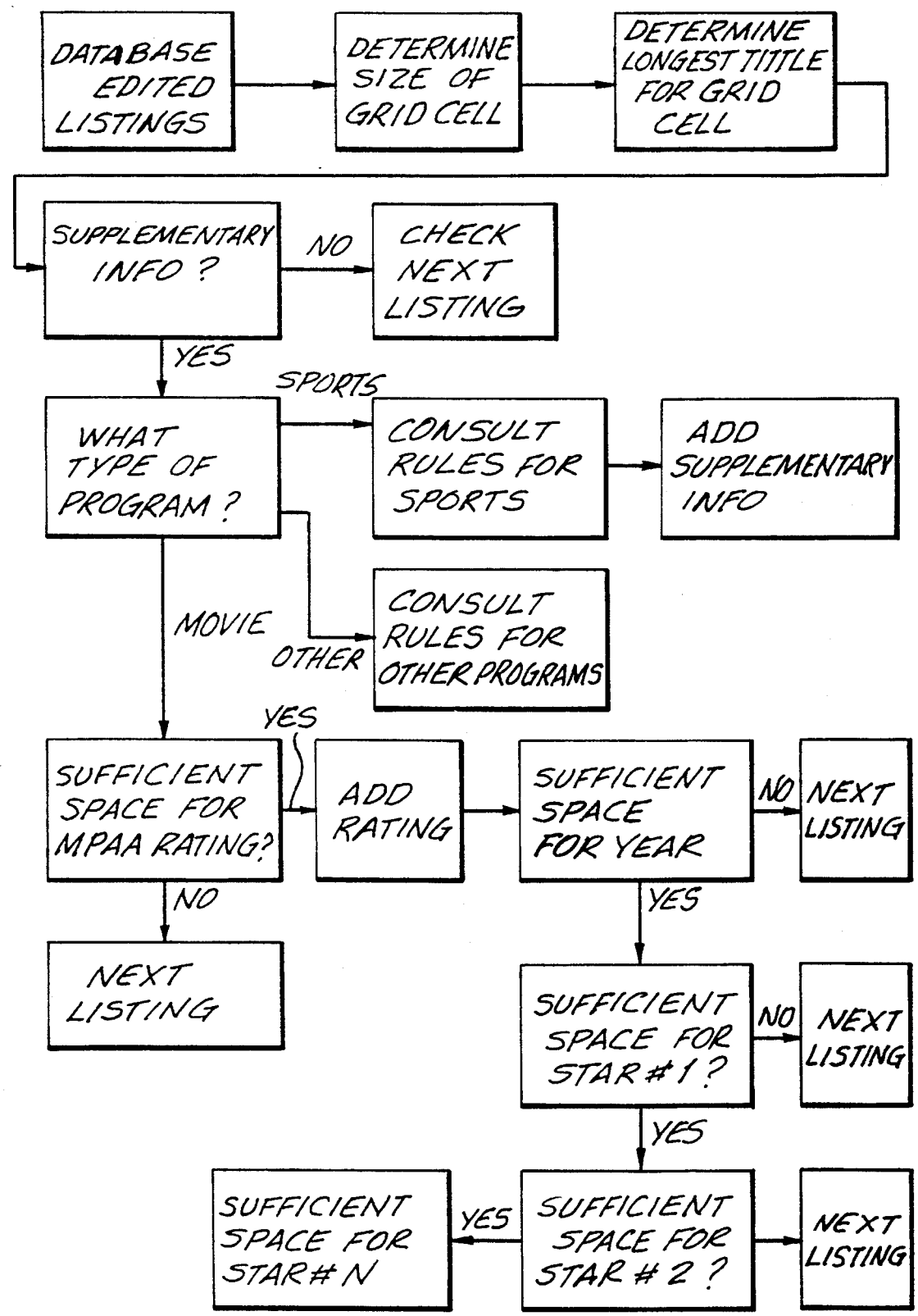
FIG. 10b is a flow chart showing the operation of a preferred embodiment of the supplementary information editing portion of the text fit system of the invention herein.

After all titles requiring exiting have been edited, either automatically by consulting the library or manually by an editor, the listings are stored in program listings database 120 for subsequent transmission to a cable head-end 10. Upon receipt by a cable head-end 10, the portion of the text fit system resident on the data processor 41 operates as shown in the flow chart of FIG. 10*b*. For many listings, additional space will be available on the second line and possibly the first line as well. This space may be used for the display of supplementary information in addition to the title of the program. Supplementary information is displayed according to a fixed set of rules programmed into data processor 41. The rules are applied to determine how available space in a grid cell is to be filled. For example, for a two hour movie, there will typically be space available in addition to that required for display of the title, particularly when the 90 and 120 minute grid cells are activated. The data process determines how much space is available and fills it according to the programmed rules. For example, for a movie, the data processor will first determine if there is space available to display the MPAA rating of the movie. Next, the processor will determine if space is available for the year of the movie and then the characters "B&W" if the movie is in black and white (not shown in FIG. 10*b*), and finally, one or more starring actors/actresses in the movie. The supplementary information will only be displayed in those grid cells where full titles are also displayed. In this manner, additional supplementary information will be displayed for larger grid cells. The process of determining what supplementary information is displayed is fully automated and thus the requisite software may be implemented at the cable head-end 10. If space is available, the data processor consults the appropriate data field as dictated by the rules and determines whether supplementary information may be displayed. For PPV movies, a different set of rules for display of supplementary information may be implemented. If an additional line in the grid boxes is provided for PPV movies., there may be space for display of ordering information, such as price, phone number, and the time window during which the program may be ordered. For these movies, the priority for allocating the available space in the grid box may be as follows: phone number, time window, price, rating, year, and actors.

This automated portion of the text fit system may be implemented as follows: each time a page is formatted, computer 41 retrieves the listings to be displayed and determines the sizes of the grid cells based on the duration of the program and the current time. As indicated above, if the size of the grid cell is too small to fit the entire title, the listings data will include an edited title for that grid cell. Data processor 41 is programmed to retrieve the longest title that will fit in the designated grid cell. If the size of the cell is sufficiently large to fit the full title as well as supplementary information, the text fit system determines what supplementary information is to be included as the pages of listings information are being composed. Performing the automated steps at the head-end is a preferred embodiment because it simplifies the data that is transmitted to each head-end. It of course is also possible for data processor 115 to perform these automated steps as well and thus provide complete grid listings, including supplementary information, for each required cell size to listings database 120, thereby eliminating the need for any text fit functions by processor 41.

The benefits of the text fit system are illustrated in FIG. 11. FIG. 11a shows an example of a grid cell using the disclosed text fit system as compared with FIG. 11b that shows an example of current systems that merely truncate the listing if there is not adequate space for display of the complete title.

The disclosed guide channel system and method provides the cable system operator much flexibility in controlling what is displayed on the guide channel. As discussed above, because display pages are in effect created in real time by the data processor controlling the multimedia generator, as opposed to being composed by overlaying data and video feeds on to a fixed template. Each element of the guide channel display can thus be controlled with respect to schedule, position, and size. This includes promotional windows, background views, and any other graphics associated with the display. For example, as discussed above, it may be desirable to have different size windows for displaying promotional clips as opposed to a fixed format. In this manner, the promotional window may even be expanded to full screen for major event promotion. Similarly, the data processor can vary the position of the promotional window in the display. It will be apparent to those of skill in the art that the disclosed guide channel system provides a platform upon which many variations of the particular embodiments discussed herein are possible.

Alternate Embodiment

In an alternate embodiment of the present invention, the disclosed passive electronic program guide may be combined with an interactive program guide as follows: subscribers desiring the interactive features in the program guide would be provided a cable converter box including additional processor and memory capabilities. The hardware and software utilized in such interactive converters can be identical to that disclosed in applicants' two prior, co-pending applications titled "Electronic Television Program Schedule Guide System and Method," filed Sep. 9, 1993 and assigned Ser. No. 08/119,367, and "Improved Electronic Television Program Schedule Guide System and Method," filed the same date as the present application. The disclosure of these two prior applications is incorporated herein by reference. Depending on the desired functionality of the interactive portion of the guide, the processor and memory requirements of the converter box may be reduced accordingly. A block diagram of one possible implementation of the interactive portion of the guide is shown in FIG. 12.

Figure 12:
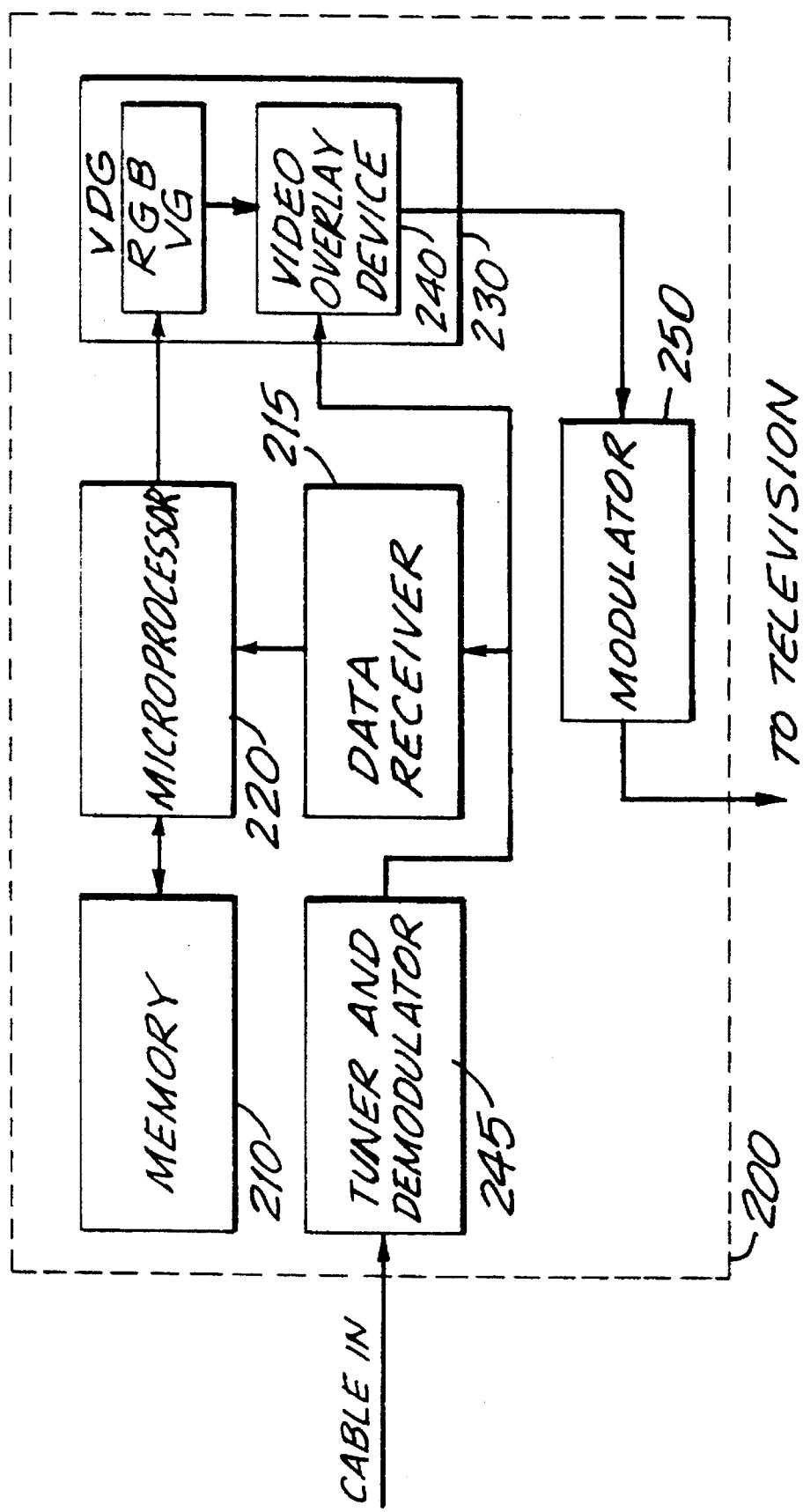
FIG. 12 is a block diagram of an alternate embodiment of the invention herein including an interactive electronic program guide.

FIG. 12 shows an interactive cable converter box 200 including memory 210. Program schedule information could then be downloaded and stored in the converter box memory 210 and displayed on the television receiver in overlaying relationship with the electronic program guide channel display being broadcast on a dedicated cable channel. Thus, the display environment of the disclosed guide channel can be retained, but the listings portion of the guide controlled locally by the subscriber's converter box. In this manner, the video-dominant features of the guide channel are retained, such as the promotional video clips.

The same method for display of program listings disclosed in applicants' above referenced co-pending application may be utilized for user control of the listings display in the present invention. Referring again to FIG. 12, a microprocessor 220, operating according to user-control commands, selects program schedule information for a plurality of television channels from memory 210. The program schedule information may be digitally transmitted to the subscriber's converter box in any of a number of ways, such as in the vertical blanking interval of the broadcast signal of the program guide channel. The listings information, along with corresponding display mode control information from the electronic program guide channel is received by data receiver 215, and then processed by microprocessor 220. In addition, the application software for implementing or updating the interactive portion of the electronic program guide may also be transmitted from the cable head-end to subscribers. The cable converter box at the viewer location will not be described in detail as such apparatus are known. For example, the components shown schematically in FIG. 12 may be implemented in a commercially available converter box, such as the model 8600x manufactured by Scientific Atlanta, for example. It will be understood by those skilled in the art that any number of other commercially available cable converter boxes may be used as well.

Operation of the combined guide channel/interactive electronic program guide is as follows. The microprocessor issues control commands to video display generator (VDG) 230 based on user inputs. The VDG includes a standard RGB video generator 235, which takes the digital program schedule information sent by microprocessor 220 and converts it to an RGB format in accordance with a bit map for the screen display. VDG 230 includes a Video Overlay Device 240, which accepts the RGB video input, as well as the video (program guide channel) signal from the tuner/demodulator 245 of cable converter box 200, which is supplied in standard NTSC video format. The overlay device 240 converts and combines the RGB signal with the signal from the tuner/demodulator, and produces a composite NTSC output signal containing both the original video signal from the program guide channel and the interactive program schedule information as controlled by the user. This composite video signal is supplied to a modulator 250, shown in FIG. 12, and then to the television receiver 260, which the user keeps tuned to the modulated channel, for example, channel 3 or 4.

The advantage of the above program guide channel/ interactive electronic program guides is that it combines the advantage of a guide channel system—the video features including promotional video clips—with the benefit of user control over display of selected program schedule information as opposed to waiting for the desired information to appear. This may be achieved with only limited additional processor and memory requirements in the converter box. In one such embodiment of the combined program guide channel/interactive program guide, the program listings may be displayed in the same grid format as in the passive guide. The viewer, however, could issue control commands to the cable converter box using, e.g., an infrared remote control device, to manually scroll the grid so as to control the channels being displayed. In addition, the viewer may also use the remote control to issue commands to shift the grid to the right to view future time slots.

The form and content of a particular computer program to implement the invention disclosed herein will be readily apparent to those skilled in the art of video system programming and graphic display based on the description contained herein and associated flow diagrams. It will also be appreciated by those skilled in the art that there can be departure from the specific embodiment of the invention described herein without departing from the true scope of the claims appended hereto.

We claim:

1. In a system for providing an electronic program guide for transmission on a television channel, a method for generating a schedule for display of information, said method comprising the steps of:

providing a database of a plurality of pieces of information to a data processor, selecting a time period for generation of said schedule, assigning each said piece of information a priority factor based on the desired display frequency of said piece of information, establishing a first time slot in said time period, said first time slot commencing concurrently with the beginning of said time period, selecting, for said first time slot, one of said pieces of information for display from said plurality of pieces based on the priority factor of said selected piece, scheduling said selected piece of information for display during said first time slot, adjusting the priority factor of said selected piece of information in accordance with a user-defined post-selection priority adjustment factor, and repeating said establishing, information selecting, scheduling, and adjusting steps for a plurality of temporally sequential time slots in said time period.

2. The method of claim 1 wherein said pieces of information comprise promotional video clips.

3. The method of claim 1 wherein said pieces of information are categorized and said priority factors are assigned based on said categories.

4. The method of claim 1 wherein said plurality of time slots are of equal duration.

5. The method of claim 1 wherein the priority factor of said selected piece of information is decreased in response to selection and scheduling of said selected piece of information.

6. The method of claim 1 wherein the priority factors of said not-selected pieces of information are increased in response to selection and scheduling of said selected piece of information.

7. The method of claim 1 Wherein said selecting step further comprises determining the eligibility for display during a time slot of one or more pieces of said information prior to selecting a piece of information for display during said time slot.

8. The method of claim 3 wherein the priority factors of each of said not-selected pieces of information are increased dependent upon the category of each of said not-selected pieces of information.

9. In a system for providing an electronic program guide for transmission on a television channel, a method for generating a schedule for display of information associated with programs scheduled for transmission at predetermined times in the future, said method comprising the steps of:

providing a database of a plurality of pieces of information to a data processor wherein each said piece of information is associated with a program scheduled for transmission at a predetermined time in the future and is within a predetermined category of programs, selecting a time period for generation of said schedule, assigning each said piece of information a priority factor based on the category of said associated program, establishing a first time slot in said period, said first time slot commencing concurrently with the beginning of said time period, selecting, for said first time slot, one of said pieces of information for display from said plurality of pieces of information based on the priority factor of said selected piece, scheduling said selected piece of information for display during said first time slot, adjusting the priority factor of said selected piece of information in accordance with a user-defined post-selection priority adjustment factor, and repeating said establishing, information selecting, scheduling and ad steps for a plurality of temporally sequential time slots in said time period.

10. The method of claim 9 wherein said information comprises video clips of said programs scheduled for transmission at predetermined times in the future.

11. The method of claim 9 wherein the priority factor of said selected piece of information is decreased in response to selection and scheduling of said selected piece of information.

12. The method of claim 9 wherein the priority factors of said not-selected pieces of information are increased in response to selection and scheduling of said selected piece of information.

13. In a system for providing an electronic program guide for transmission on a television channel, a method for generating a schedule for display of information wherein each piece of information is associated with a program scheduled for transmission in the future, the method comprising the steps of:

a) providing a database of a first plurality of pieces of information to a data processor, said database comprising, for each said piece of information, a category identification, an indication of the eligible time periods for display, and an indication of the scheduled transmission time of the program associated with said piece of information, b) assigning each of said pieces of information a priority factor based on said category identifications, c) selecting a time period for generation of said schedule, d) establishing a first time slot in said period, said first time slot commencing concurrently with the beginning of said time period, e) defining a second plurality of pieces of information for display during said first time slot based on said indicated eligible time periods for said pieces of information, f) for each of said second plurality of pieces of information, adjusting said priority factor if said first time slot is less than a predetermined mount of time prior to the scheduled transmission time of the program associated with said piece of information, g) selecting a piece of information for display during said first time slot based on said adjusted priorities of said second plurality of pieces of information, h) scheduling said selected piece of information for display during said first time slot, i) adjusting the priority factor of said selected piece of information in accordance with user-defined post-selection priority adjustment factor, and repeating steps e–i for a plurality of temporally sequential time slots in said time period.

14. The method of claim 13 wherein said adjusting step comprises increasing the priority factor if said first time slot is less than a predetermined amount of time prior to the scheduled transmission time of the program associated with said piece of information.

15. In a system for providing an electronic program guide for transmission on a television channel, a method for generating a schedule for display of information wherein each piece of information is associated with a program scheduled for transmission in the future, the method comprising the steps of:

providing a database of a plurality of pieces of information to a data processor, said database comprising, for each said piece of information, a category identification, and an indication of the eligible time periods for display, assigning each of said pieces of information a priority factor based on said category identifications, selecting a time period for generation of said schedule, establishing a first time slot in said period, said first time slot commencing concurrently with the beginning of said time period, defining a second plurality of pieces of information for display during said first time slot based on said indicated eligible time periods for said pieces of information, selecting a piece of information for display during said first time slot from said second plurality of pieces of information based on said priorities of said second plurality of pieces of information, scheduling said selected piece of information for display during said first time slot, adjusting the priority factor of said selected piece of information in accordance with user-defined post-selection priority adjustment factor, and repeating said defining, information selecting, scheduling and adjusting steps for a plurality of temporally sequential time slots in said time period.

16. In a system for providing an electronic program guide for transmission on a television channel, a method for generating a schedule for display of information wherein each piece of information is associated with a program scheduled for transmission in the future, the method comprising the steps of:

a) providing a database of a plurality of pieces of information to a data processor, said database comprising, for each said piece of information, a category identification, an indication of the eligible time periods for display, and an indication of the scheduled transmission time of the program associated with said piece of information, b) assigning each of said pieces of information a priority factor based on said category identifications, c) for each of said pieces of information, adjusting said priority factor if said scheduled transmission time of the program associated with said piece of information is within a predetermined time window, d) selecting a time period for generation of said schedule, e) establishing a first time slot in said period, said first time slot commencing concurrently with the beginning of said time period, f) defining a second plurality of pieces of information for display during said first time slot based on said indicated eligible time periods for said pieces of information, g) selecting a piece of information for display during said first time slot from said second plurality of pieces of information based on said adjusted priorities of said second plurality of pieces of information, h) scheduling said selected piece of information for display during said first time slot, i) adjusting the priority factor of said selected piece of information in accordance with a user-defined post-selection priority adjustment factor, and j) repeating steps f–i for a plurality of temporally sequential time slots in said time period.

17. In a system for providing an electronic program guide for transmission on a television channel, a method for generating a schedule for display of information wherein each piece of information is associated with a program scheduled for transmission in the future, the method comprising the steps of:

a) providing a database of a plurality of pieces of information to a data processor, each said piece of information associated with a program scheduled for transmission at a predetermined time in the future, b) selecting a time period for generation of said schedule, c) assigning, for each said piece of information, a priority factor based on the desired display frequency of said piece of information, d) establishing a first time slot in said period, said first time slot commencing concurrently with the beginning of said time period, e) adjusting, for said first time slot, the priority factor of one or more pieces of information based on the temporal proximity of said first time slot to said predetermined transmission times of said programs associated with said one or more pieces of information, f) selecting, for said first time slot, one of said pieces of information for display from said plurality of pieces based on the priority factors of said pieces, g) scheduling said selected piece of information for display during said first time slot, h) adjusting the priority factor of said selected piece of information in accordance with user-defined post-selection priority adjustment factor, and i) repeating steps e–h for a plurality of temporally sequential time slots in said time period.

18. The method of claim 17 wherein said pieces of information comprise promotional video clips.

19. The method of claim 17 wherein said pieces of information are categorized and said priority factors are assigned based on said categories.

20. The method of claim 17 wherein said time slots are of equal duration.

21. The method of claim 17 wherein the priority factor of said selected piece of information is decreased in response to selection and scheduling of said selected piece of information.

22. The method of claim 17 wherein the priority factors of said not-selected pieces of information are increased in response to selection and scheduling of said selected piece of information.

23. The method of claim 17 wherein said selecting step further comprises determining the eligibility for display during a time slot of one or more pieces of said information prior to selecting a piece of information for display during said time slot.

24. The method of claim 19 wherein the priority factors of each of said not-selected pieces of information are increased dependent upon the category of each of said not-selected pieces of information.

25. In a system for providing an electronic program guide for transmission on a television channel, apparatus for generating a schedule for display of information comprising:
    means for providing a database of a plurality of pieces of information to a data processor, said data processor comprising:
        means for selecting a time period for generation of said schedule;
        means for establishing a first time slot in said time period, said first time slot commencing concurrently with said time period;
        means for assigning each said piece of information a priority factor based on the desired display frequency of said piece of information;
        means for selecting, for said first time slot, one of said pieces of information for display from said plurality of pieces based on the priority factor of said selected piece;
        means for scheduling said selected piece of information for display during said first time slot;
        means for adjusting the priority factor of said selected piece of information in accordance with a user-defined post-selection priority adjustment factor; and
        means for repeatedly invoking said establishing, information selecting, scheduling, and a means for a plurality of temporally sequential time slots in said time period.

26. The apparatus of claim 25 wherein said pieces of information comprise promotional video clips.

27. The apparatus of claim 25 wherein said pieces of information are categorized and said priority factors are assigned based on said categories.

28. The apparatus of claim 25 wherein said time slots are of equal duration.

29. The apparatus of claim 25 wherein the priority factor of said selected piece of information is decreased in response to selection and scheduling of said selected piece of information.

30. The apparatus of claim 25 wherein the priority factors of said not-selected pieces of information are increased in response to selection and scheduling of said selected piece of information.

31. The apparatus of claim 25 wherein said selecting means further comprises means for determining the eligibility for display during a time slot of one or more pieces of said information prior to selecting a piece of information for display during said time slot.

32. The apparatus of claim 27 wherein the priority factors of each of said not-selected pieces of information are increased dependent upon the category of each of said not-selected pieces of information.

33. In a system for providing an electronic program guide for transmission on a television channel, apparatus for generating a schedule for display of information associated with programs scheduled for transmission at predetermined times in the future comprising:
    means for providing a database of a plurality of pieces of information to a data processor wherein each said piece of information is associated with a program scheduled for transmission at a predetermined time in the future and is within a predetermined category of programs, said data processor comprising:
        means for selecting a time period for generation of said schedule;
        means for assigning each said piece of information a priority factor based on the category of said associated program;
        means for establishing a first time slot in said period, said first time slot commencing concurrently with the beginning of said time period;
        means for selecting, for said first time slot, one of said pieces of information for display from said plurality of pieces of information based on the priority factor of said selected piece;
        mean for scheduling said selected piece of information for display during said first time slot;
        means for adjusting the priority factor of said selected piece of information in accordance with a user-defined post-selection priority adjustment factor; and
        means for repeatedly invoking said establishing, information selecting, scheduling, and adjusting means for a plurality of temporally sequential time slots in said time period.

34. The apparatus of claim 33 wherein said information comprises video clips of said programs scheduled for transmission at predetermined times in the future.

35. The apparatus of claim 33 wherein the priority factor of said selected piece of information is decreased in response to selection and scheduling of said selected piece of information.

36. The apparatus of claim 33 wherein the priority factors of said not-selected pieces of information are increased in response to selection and scheduling of said selected piece of information.

37. In a system for providing an electronic program guide for transmission on a television channel, apparatus for generating a schedule for display of information wherein each piece of information is associated with a program scheduled for transmission in the future comprising:
    means for providing a database of a first plurality of pieces of information to a data processor, said database comprising, for each said piece of information, a category identification, an indication of the eligible time periods for display, and an indication of the scheduled transmission time of the program associated with said piece of information;

said data processor comprising:
  means for assigning each of said pieces of information a priority factor based on said category identifications;
  means for selecting a time period for generation of said schedule;
  means for establishing a first time slot in said time period, said first time slot commencing concurrently with the beginning of said time period;
  means for defining a second plurality of pieces of information for display during said first time slot based on said indicated eligible time periods for said pieces of information,
  for each of said second plurality of pieces of information, first means for adjusting said priority factor if said first time slot is less than a predetermined amount of time prior to the scheduled transmission time of the program associated with said piece of information;
  means for selecting a piece of information for display during said first time slot based on said adjusted priorities of said second plurality of pieces of information;
  means for scheduling said selected piece of information for display during said first time slot;
  second means for adjusting the priority factor of said selected piece of information in accordance with a user-defined post-selection priority adjustment factor; and
  means for repeatedly invoking said defining, first adjusting, information selecting, scheduling and second adjusting means for a plurality of temporally sequential time slots in said time period.

38. The method of claim 37 wherein said adjusting means comprises means for increasing the priority factor if said first time slot is less than a predetermined amount of time prior to the scheduled transmission time of the program associated with said piece of information.

39. In a system for providing an electronic program guide for transmission on a television channel, apparatus for generating a schedule for display of information wherein each piece of information is associated with a program scheduled for transmission in the future comprising:
  means for providing a database of a plurality of pieces of information to a data processor, said database comprising, for each said piece of information, a category identification, and an indication of the eligible time periods for display;
  said data processor comprising:
    means for assigning each of said pieces of information a priority factor based on said category identifications;
    means for selecting a time period for generation of said schedule;
    means for establishing a first time slot in said period, said first time slot commencing concurrently with the beginning of said time period;
    means for defining a second plurality of pieces of information for display during said first time slot based on said indicated eligible time periods for said pieces of information;
    means for selecting a piece of information for display during said first time slot based on said priorities of said second plurality of pieces of information;
    means for scheduling said selected piece of information for display during said first time slot;
    means for adjusting the priority factor of said selected piece of information in accordance with a user-defined post-selection priority adjustment factor; and
    means for repeatedly invoking said defining, information selecting, scheduling and adjusting means for a plurality of temporally sequential time slots in said time period.

40. In a system for providing m electronic program guide for transmission on a television channel, apparatus for generating a schedule for display of information wherein each piece of information is associated with a program scheduled for transmission in the future:
  means for providing a database of a plurality of pieces of information to a data processor, said database comprising, for each said piece of information, a category identification, an indication of the eligible time periods for display, and an indication of the scheduled transmission time of the program associated with said piece of information;
  said data processor comprising:
    means for assigning each of said pieces of information a priority factor based on said category identifications;
    for each said piece of information, first means for adjusting said priority factor if said scheduled transmission time of the program associated with said piece of information is within a predetermined time window;
    means for selecting a time period for generation of said schedule;
    means for establishing a first time slot in said time period, said first time slot commencing concurrently with the beginning of said time period;
    means for defining a second plurality of pieces of information for display during said first time slot based on said indicated eligible time periods for said pieces of information;
    means for selecting a piece of information for display during said first time slot based on said adjusted priorities of said second plurality of pieces of information;
    means for scheduling said selected piece of information for display during said first time slot;
    second means for adjusting the priority factor of said selected piece of information in accordance with a user-defined post-selection priority adjustment factor; and
    means for repeatedly invoking said defining, information selecting, scheduling and second adjusting means for a plurality of temporally sequential time slots in said time period.

41. In a system for providing an electronic program guide for transmission on a television channel, apparatus for generating a schedule for display of information wherein each piece of information is associated with a program scheduled for transmission in the future comprising:
  means for providing a database of a plurality of pieces of information to a data processor, each said piece of information associated with one or more programs scheduled for transmission at predetermined times in the future;
  said data processor comprising:
    means for selecting a time period for generation of said schedule;
    first means for assigning, for each said piece of information, a priority factor based on the desired display frequency of said piece of information,
    means for establishing a first time slot in said period, said first time slot commencing concurrently with the beginning of said time period;

first means for adjusting, for said first time slot, the priority factor of one or more pieces of information based on the temporal proximity of said first time slot to said predetermined transmission times of said programs associated with said one or more pieces of information;

means for selecting, for said first time slot, one of said pieces of information for display from said plurality of pieces based on the priority factors of said pieces;

means for scheduling said selected piece of information for display during said first time slot;

means for adjusting the priority factor of said selected piece of information in accordance with a user-defined post-selection priority adjustment factor; and means for repeatedly invoking said first adjusting, information selecting, scheduling and second adjusting means for a plurality of temporally sequential time slots in said time period.

42. The apparatus of claim 41 wherein said pieces of information comprise promotional video clips.

43. The apparatus of claim 41 wherein said pieces of information are categorized and said priority factors are assigned based on said categories.

44. The apparatus of claim 41 wherein said time slots are of equal duration.

45. The apparatus of claim 41 wherein the priority factor of said selected piece of information is decreased in response to selection and scheduling of said selected piece of information.

46. The apparatus of claim 41 wherein the priority factors of said not-selected pieces of information are increased in response to selection and scheduling of said selected piece of information.

47. The apparatus of claim 41 wherein said selecting means further comprises means for determining the eligibility for display during a time slot of one or more pieces of said information prior to selecting a piece of information for display during said time slot.

48. The apparatus of claim 43 wherein the priority factors of each of said not-selected pieces of information are increased dependent upon the category of each of said not-selected pieces of information.

49. In a system for providing an electronic program guide for transmission on a television channel, a method for generating a schedule for display of information wherein each piece of information is associated with a program scheduled for transmission in the future, the method comprising the steps of:

providing a database of a plurality of pieces of information to a data processor, each said piece of information associated with a program scheduled for transmission at a predetermined time in the future, selecting a time period for generation of said schedule, selecting, within said time period, a first time slot, assigning, for each said piece of information, a priority factor wherein the priority factor assigned to each said piece of information depends upon the temporal proximity of said time slot to said predetermined transmission time of said program associated with said piece of information, selecting, for said first time slot, one of said pieces of information for display from said plurality of pieces based on the priority factors of said pieces, scheduling said selected piece of information for display during said first time slot, adjusting said priority factor of said selected piece in accordance with a user-defined post-selection priority adjustment factor, and repeating said time slot selecting, assigning, information selecting, scheduling, and adjusting steps for a plurality of time slots within said time period.

50. In a system for providing an electronic program guide for transmission on a television channel, apparatus for generating a schedule for display of information wherein each piece of information is associated with a program scheduled for transmission in the future comprising:

means for providing a database of a plurality of pieces of information to a data processor, each said piece of information associated with a program scheduled for transmission at a predetermined time in the future;

means for selecting a time period for generation of said schedule;

means for selecting, within said time period, a first time slot;

means for assigning, for each said piece of information, a priority factor wherein the priority factor assigned to each said piece of information depends upon the temporal proximity of said time slot to said predetermined transmission time of said program associated with said piece of information;

means for selecting, for said first time slot, one of said pieces of information for display from said plurality of pieces based on the priority factors of said pieces;

means for scheduling said selected piece of information for display during said first time slot;

means for adjusting said priority factor of said selected piece in accordance with a user-defined post-selection priority adjustment factor, and means for repeatedly invoking said time slot selecting, assigning, information selecting, scheduling, and adjusting means for a plurality of time slots within said time period.

* * * * *